United States Patent
Zager et al.

(10) Patent No.: US 6,393,386 B1
(45) Date of Patent: *May 21, 2002

(54) DYNAMIC MODELING OF COMPLEX NETWORKS AND PREDICTION OF IMPACTS OF FAULTS THEREIN

(75) Inventors: David Zager, Chappaqua; Robert Kostes, Brooklyn, both of NY (US)

(73) Assignee: Visual Networks Technologies, Inc., Rockville, MD (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/048,025

(22) Filed: Mar. 26, 1998

(51) Int. Cl.[7] .............................................. G06F 9/455
(52) U.S. Cl. ........................... 703/25; 703/27; 709/223; 713/201; 370/254
(58) Field of Search ....................... 395/500.05, 500.34, 395/500.44; 709/224, 300, 223, 227, 228; 703/25, 27; 370/254; 713/201

(56) References Cited

U.S. PATENT DOCUMENTS

| | | | |
|---|---|---|---|
| 4,985,857 A | | 1/1991 | Banpai et al. .......... 364/551.01 |
| 5,195,095 A | | 3/1993 | Shah ......................... 371/15.1 |
| 5,295,244 A | | 3/1994 | Dev et al. ..................... 395/161 |
| 5,309,448 A | | 5/1994 | Bouloutas et al. .......... 371/29.1 |
| 5,317,568 A | * | 5/1994 | Bixby et al. ................ 370/85.6 |
| 5,517,622 A | * | 5/1996 | Ivanoff et al. ......... 395/200.13 |
| 5,528,516 A | | 6/1996 | Yemini et al. .......... 364/551.01 |
| 5,608,720 A | * | 3/1997 | Biegel et al. ................ 370/249 |
| 5,661,668 A | | 8/1997 | Yemini et al. ............... 364/550 |
| 5,748,896 A | * | 5/1998 | Daly et al. .............. 395/200.53 |
| 5,799,153 A | * | 8/1998 | Blau et al. .............. 395/200.53 |
| 5,854,750 A | * | 12/1998 | Phillips et al. .......... 364/478.04 |
| 5,918,051 A | * | 6/1999 | Savitzky et al. ............. 395/683 |
| 5,951,680 A | * | 9/1999 | Redlin et al. .................... 713/1 |

OTHER PUBLICATIONS

"HP Open View Network Node Manager", Administrator's Reference, Hewlett Packard, Manual Part No. J2316–900005, 12/93.

(List continued on next page.)

Primary Examiner—Kevin J. Teska
Assistant Examiner—T. Phan

(57) ABSTRACT

A method and system are provided for use in administering a complex system, such as a distributed computing ensemble. A model of the system being administered is prepared, preferably during runtime of the invention, by a combination of autodiscovery processes and manual input of information as needed. The model represents not only the resources found in the administered system, but also the service-relationships among those resources. The system administrator also can define elements in the model corresponding to arbitrary groupings of already-existing parts of the model. Software agents, which can be reconfigured, started and terminated as desired during runtime, report changes in state of the managed resources to the model, which updates itself and explores portions of the model adjacent (in terms of the service relationships) to the affected resource(s). Clusters of neighboring state-changes that have a logical relation to each other are grouped together as an alarm, and are preferably represented in a graphical display. Any root-cause event of this type is marked as such, and any portions of the modeled system being (or logically likely to be) affected by the changes are also identified and displayed.

17 Claims, 28 Drawing Sheets

OTHER PUBLICATIONS

A.T. Bouloutas, et al, "Alarm Correlation and Fault Identification in Communication Networks", IEEE Transactions, vol. 42, No. 2/3/4, Feb./Mar./Apr. 1994.

Mark W. Sylor, Managing Phase V DECnet Networks: the Entity Model, IEEE Network, vol. 2, No. 2, 3/88.

S. Mark Klerer, "The OSI Management Architecture: an Overview", IEEE Network, vol. 2, No. 2, 3/88.

Mark T. Sutter et al., Designing Expert Systems for Real–Time Diagnosis of Self–Correcting Networks, IEEE Network, 9/98.

German Goldszmidt et al., "Evaluating Management Decisions via Delegation", Integrated Network Management, III, 1993.

International Communication Union, CCITT The International Telegraph and Telephone Consultative Committee X.731, "Data Communication Networks", 1/92.

J.F. Jordaan et al., "Event Correlation in Heterogeneous Networks Using the OSI Management Framework", Unit for Software Engineering, Department of Computer Science, University of Pretoria, South Africa.

International Communication Union, CCITT The International Telegraph and Telephone Consultative Committee X.832, "Data Communication Networks", 1/92.

* cited by examiner

DYNAMIC MODELING OF COMPLEX NETWORKS AND PREDICTION OF IMPACTS OF FAULTS THEREIN

BACKGROUND OF THE INVENTION

1. Technical Field of the Invention

This invention relates generally to the field of the operation and management of complex systems, including the operation and management of computer networks.

2. Description of Related Background Art

The present invention is intended to facilitate the management of a large-scale, far-flung computer network, such as the extensive distributed systems that are commonplace nowadays in large organizations. The person or team responsible for this job is typically in charge of everything from the organization's power supplies through its business software applications. The organization's business management, naturally, may not wish to concern itself with the technical details, but does demand that when problems occur, they be dealt with according to the seriousness of the effects they have on the normal operations of the business. For example, management will want the greatest attention to be paid to those problems that affect the highest revenue generators among the various parts of the business organization.

This is a difficult demand to meet. For many network operation managers, it can be very hard just managing the network, identifying, diagnosing and correcting problems as they occur. Being able to prioritize among a set of problems occurring during the same time period in such a way as to differentiate among levels of service being provided to different parts of the business organization has thus far been beyond contemplation. One important purpose of the present invention is to make this goal attainable.

The phenomenal complexity of the world of a large distributed network of interrelated components is reflected in the distribution of costs involved in managing such a system. According to one study, about $2.00 of every $10.00 spent on distributed systems engineering and operations, is spent on engineering, while the other $8.00 is for operations. Moreover, about $6.00 of that $8.00 is spent on problem isolation and diagnosis, while only about $2.00 goes to problem resolution.

If it takes on average three times as long to identify a problem as it does to solve it, the soup of distributed systems parts (hardware and software) and their interrelationships is nearly impenetrable to the operators. This complexity has many sources:

Hardware and software components are heterogeneous. System components are globally distributed. Subcontractors may be running the system, or parts of it, on their own sites, or the business's, or both.

Engineers include multiple redundancies in the design of the system to minimize outages, but each redundancy adds extra complexity to manage. Systems themselves are not self-aware, and cannot report what is wrong with them. At best, individual components can report their states. Component reuse leads to the same components participating in multiple run-time relationships. The "health" of a given component increasingly depends on a contextual, not isolated, evaluation of its state.

A given underlying condition may affect different users in different ways, or to different degrees—one user may be affected seriously, another critically, another benignly or not at all. Problems cascade; locating the eye or center of a storm of phenomena is not easy.

It may even be deemed surprising that only 75% of operations time is spent on identifying problems.

At present, operators are unable to tell how a given problem affects the various users in the business organization, and therefore are unable to know where they should direct enhanced or reduced service efforts, until the problem has been correctly identified. One result of this is that the operations managers have only the other 25% of operations time—the problem resolution portion—from which to carve out all service differentiation.

What is worse, identification of the problem does not necessarily lead clearly to successful resolution of the problem. For example, suppose that the operator has correctly identified the root of a given problem as a bad card in an IP ("Internet Protocol") router. Do any critical business systems depend on that router? Perhaps, or perhaps not.

Continue with the same example. Suppose that the malfunctioning router lies on one leg of a redundant circuit that connects many disparate data delivery functions in a financial services organization. What effect does the fault have on various users?

The network system administrator always needs to know immediately, so that he can go and replace the card.

The manager of a profitable business unit may have invested in redundant circuits, and so experiences no problem.

The manager of a mid-sized unit has co-invested in redundant circuits with another business unit; their joint load on the single remaining circuit permits continued service, but performance deteriorates.

Network engineering has been experimenting with new router cards on their alternate circuit and has rendered that circuit inoperable; they have no service at all.

A market analyst in Brussels receiving critical data from Hong Kong is going to be delayed when she loses all service; she need not have any idea what a router is, or that one exists, but she does need to understand quickly the impact of its disappearance on her work.

A capacity planner needs to know the frequency with which router cards fail, if one brand suffers more failures than another, or if it is necessary to invest in redundant circuits for a group of users whose work is time-sensitive. She does not need to know this instant that some specific router had a bad card.

This single example of a set of failures among computing system components has affected users quite differently. For operations personnel, knowing that the cause of the current set of events was a malfunctioning router card is a start, but provides inadequate understanding for addressing all these needs.

Before the operator can direct problem resolution efforts to a specific part of the business organization, therefore, he or she needs to understand the systemic impact of the problem. Impact is sensitive to a wide system context, and even to conditions of the moment (for instance, the task the Brussels analyst is working on). The operations manager can attempt to deliver differentiated levels of service only when she knows whether and how this particular fault has affected particular groups of users under the conditions of the network at the time of the failure.

SUMMARY OF THE INVENTION

It is one object of the present invention to provide a solution to the problem described above. In particular, it is an object to provide the ability to understand the impacts of a given problem on different parts of the organization using the system, at the time the problem occurs, so as to be in a better position to direct problem resolution efforts and problem alleviation efforts intelligently.

Another object of the invention is to provide the ability to model, not only the significant hardware and software resources of the system being administered, but also the service relationships connecting those resources, in a flexible, dynamic manner, so that changes to the construction or make-up of the system being managed can be reflected promptly in the model without the need to restart the model or otherwise to interrupt running the model.

Another object of the invention is to provide a method and system that can associate related events that are of interest to the operators and users of the administered system, and present the results quickly and in a way that makes the information easy to use.

Another object of the invention is to provide a method by which one can flexibly model a system, and in which one can represent, not only the hardware and software resources of the system being modeled, but also arbitrarily-defined groups of those resources.

Still another object of the invention is to provide a method and system in which the operators or a user can define, as needed, a set of data to be obtained relating to the performance of the modeled system, and to provide a particularly convenient way to organize control data to fulfill those requests using agents to obtain the required information.

The preferred embodiment provides a software model of the managed network, and includes a flexible infrastructure for the purpose of obtaining information from the managed network and reporting it as appropriate. In runtime, the data-gathering infrastructure is used to obtain information about what components are present in the network, and about what services each is providing to which other component(s). This information is used to construct the model. In addition, the data-gathering infrastructure obtains from the managed resources information relating to any malfunction or performance degradation, and reports this information to the model, which modifies its state accordingly. The structure of the model itself is used to predict the likely impacts of the reported occurrence, and the occurrence and its predicted impacts are displayed. As all this happens, the data-gathering infrastructure also obtains information concerning the addition of new components to the managed network, the deletion of others, etc., allowing the model to update itself during runtime.

In addition, the system administrators can define elements in the model to represent arbitrary groupings of components, such as business units. AS a result, the model predicts impacts not only on individual hardware and software components but also on larger entities that are of significance to the organization using the invention and the managed network.

The data-gathering infrastructure is conceptually distinct from and independent of the model. In the preferred embodiment, this infrastructure has a number of significant features, including a hierarchical structure that results in the ability to provide the model with as large a stream of data as may be necessary, while limiting the number of interrupts per unit time that the model must tolerate. In addition, this infrastructure preferably has the ability to be given new sets of working instructions during runtime, so that new types of information can be acquired, without the need for restarting the running of the program. Customized inquiries can also be provided in this way. Moreover, the data-gathering infrastructure uses software agents having a structure that makes possible a high degree of reusability, in the form of reusable modules that can be kept in a repository for that purpose.

It is to be emphasized that it is by no means necessary to use all these features together; many can be used independently of the others, to great advantage, within the scope of the invention.

The foregoing and other objects, features and advantages of the invention will be more fully appreciated from the following detailed description of the preferred embodiment, taken in conjunction with the accompanying drawings.

BRIEF DESCRIPTION OF THE DRAWINGS

In the accompanying drawings, like reference characters refer to like elements, throughout.

DETAILED DESCRIPTION OF THE PREFERRED EMBODIMENT

Figure 1:
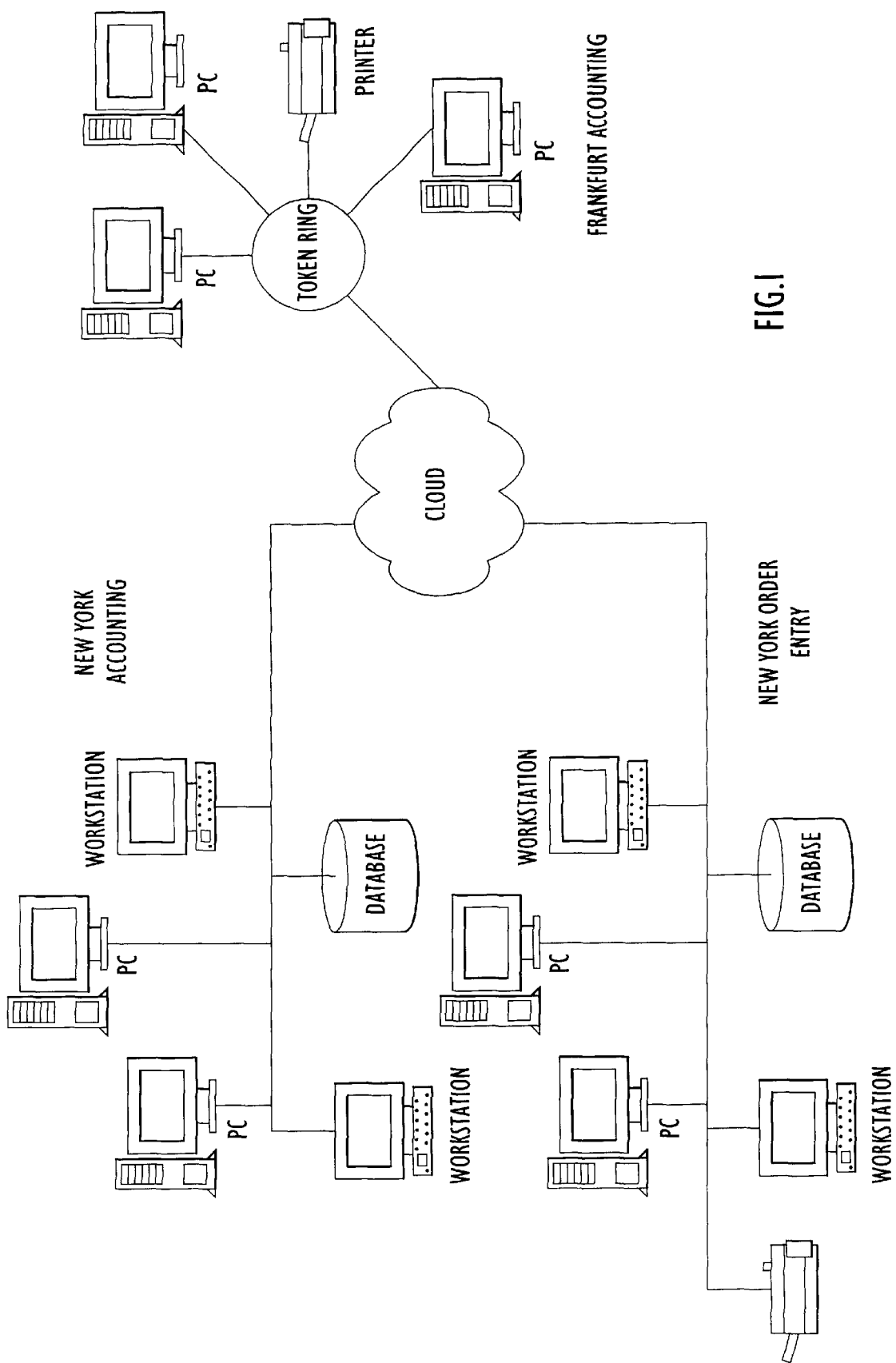
FIG. 1 is a schematic illustration of a simplified example of a distributed computing ensemble to the management of which the present invention is applicable.

FIG. 1 is a schematic illustration of a distributed computing ensemble (actually, a combination of networks interconnected to each other) as a simplified example to the management of which the present invention is applicable. In FIG. 1 are shown several subnetworks, each including a number of workstations connected together in various ways. Many or all of the workstations are connected to an intranet or to the Internet, or both. The system shown includes workstations in several offices, located in different buildings in a number of countries and continents. The workstations each run on an operating system ("OS"), but not necessarily on the same one. Also, each workstation may at a given time be running one or more application programs, any of which may require the accessing of various databases or files located at various places in the system.

The workstations are used for the purposes of an enterprise, which has organized its business functions into a variety of subdivisions, departments, etc. A number of these subdivisions are indicated in FIG. 1, including a financial research division and an accounting department. Because of the potential for malfunctions to deprive workstations of the access they need to other parts of the system (access to a particular database, for example), the enterprise has constructed redundant communication paths between certain of its departments and critical resources, although such redundancies are not shown in FIG. 1.

While only a few terminals and a few connections between them are shown, an actual system might contain hundreds or thousands of workstations, with correspondingly complex connections, redundancies and interdependencies. All aspects of the management and operation of such a system are of formidable complexity, and offer nearly boundless challenges and potential frustrations to the person or team in charge of that management.

Hereinafter, the system that is being managed using the present invention will be termed the "external system".

The preferred embodiment of the present invention can most easily be thought of as comprising two major parts: a model of the external system, and a data-gathering infrastructure that obtains data needed by the model. There are also a model server and an operational database that support the model. The model disclosed herein could, within the scope of the invention, be used with another arrangement for gathering the required information from the external system and delivering it, and conversely, the data-gathering infrastructure can be used in many applications other than providing information to a model of a complex computer network that is being managed.

The model simulates the evolution of faults and performance degradations through the external system. The model enables those who use the services of the various parts of the external system to specify the nature of their reliance thereon, in terms that will set clearly the expectations held of the operations personnel for that system. Those personnel, in turn, are enabled by the model to do what is necessary to fulfill those expectations, by showing them quickly what has gone wrong in the external system. The model also enables the operations personnel to know which part of the user community has suffered the brunt of any fault or performance degradation.

An Overview

Before proceeding with the details of the preferred embodiment, an overview of that embodiment will be useful.

The preferred embodiment of the present invention, upon installation, begins by initiating a discovery process, in which it explores the external system it is to be used in managing. In the discovery process, it locates each hardware and software component of the external system, and identifies what type of component each is (e.g., hub, router, computer, operating system, application, database, etc.). By obtaining this information from each component, and using it to determine what services each component is receiving from or providing to other components (the concept of "services" is explored more precisely below; for the present, a naive concept of the term will suffice to convey a broad view of the preferred embodiment), the invention constructs a model of the external system. This model represents the various components, relevant subcomponents, and their service relationships to each other. It should be noted that, in the preferred embodiment, the model itself does not contain all available information about the nature of each component—that is, although that information is used in the process of constructing the model, only a subset of the information acquired during the discovery process need end up in the model. This greatly simplifies the model itself, reducing the computing resources required.

If there is any component of the external system which cannot be identified adequately in this fashion by the program itself, the system administrator can manually input the information needed to include a representation of that component and of its relationships with other components, in the model. In the preferred embodiment, the represented components and subcomponents are modeled as software objects, utilizing the well-known techniques of object-oriented programming. The objects corresponding to components and sub-components are termed "managed objects" herein; again, a more precise statement of what that term means in relation to the present invention is given below. The model constitutes an example of the type of mathematical entity known as a directed graph, in which the managed objects are the nodes of the graph, and the relationships are the edges.

One important feature of the preferred embodiment is that the system administrator has the ability to define additional managed objects in the model, which additional objects correspond to arbitrary groupings of simpler objects in the model. In particular, the administrator can define as such an object any particular user group that has significance to the operation of the business enterprise or the like to which the external system belongs. (The administrator can also make such other changes to the model as appear suitable, including the deletion of existing objects, the ascription of particular characteristics to existing objects, etc.)

During operation of the external system, various software agents provided for the purpose acquire information relating to that operation. Each observation that represents a change of state for a modeled component or sub-component of the external system is reported to the model by the agent, and the model reflects the change in the corresponding managed object. Once such a change occurs in the model, an alarm is created, comprising that change and any others which, as described below, are determined to relate to the same basic fault that has caused the change. The preferred embodiment includes a table or the like listing certain changes which are assumed to be root causes (as opposed to being merely the effect of some more basic problem). If the change in question is of a type that is listed in the table, the occurrence of the change is provided with a tag that marks it as a root-cause event. Also, any managed objects whose performance may possibly be affected by the occurrence of the reported change (if that change is a root-cause event), are identified, based entirely on their location in the model (graph) relative to the managed object whose state has changed, and on their service relationships (direct or indirect) with the latter managed object. At this point, the alarm includes the reported event, its root cause (if identified) and the likely consequences.

A display is provided that shows which managed objects have had reported events that are part of an alarm. Preferably, a visual indication of any root-cause event is also provided; of course, several alarms may occur during the same period of time and are all displayed. The display provides the administrator with a quick way to see what events are being reported, which ones are likely to be related to each other, which (if any) of them is of a type likely to be a root cause, and which portions of the external system (including user groups) are likely to be affected, either immediately or soon, by the reported events.

A more detailed discussion of the preferred embodiment will now be given.

For this description, a knowledge of object-oriented programming is assumed. Also, the preferred embodiment is implemented using SmallTalk (a few parts are implemented using Java), and familiarity with these languages is assumed as well. Nonetheless, it should be noted that the particular choice of language(s) is not critical to the invention.

The Major Parts of the Preferred Embodiment

In addition to the model and the data-gathering infrastructure, the preferred embodiment includes a model server that maintains the model. An operational data store stores any information useful to the functioning of the model and not found within the model itself. A Dispatcher component controls the processing of events by the model, and a Factory component generates new managed objects, and deletes existing ones, as needed. A Control Data Repository (normally termed simply the "Control Repository" hereinafter) stores necessary control data of various types. Filters are provided to determine what information in the model is to be made available to what users of the system, and a display is used to make that information available in an easy-to-use form. A report engine is also provided to generate reports as requested by the system administrator.

Important aspects of the data-gathering infrastructure are the presence of one or more agent managers, which create, run and terminate individual software agents as necessary to obtain the required information regarding the make-up and organization of the external system (to create the model and keep it up-to-date) and regarding that system's activity (to monitor operation and provide the users with the required information concerning faults and performance degradations). Also, the structure of the dynamic software agents themselves facilitates their rapid creation whenever needed to gather any desired information, and makes it possible to design agents that will perform new tasks, with a minimum amount of trouble for the administrator.

The Model

The model utilized in the preferred embodiment of the invention contains a number of basic or primitive types of elements: Nodes, Managed Objects (hereinafter, "MO's"), Services, Faults, Events, Alarms, and Impacts. A definition of each of these terms as used herein will be found in the following description.

Nodes

The model utilized in the preferred embodiment is of interrelated objects that form a network that typically exists in many dimensions (this "network" should not be confused with the physical network or networks of the external system of FIG. 1, and, for clarity, will hereinafter be termed the "model network"). This model distinguishes strictly between physical objects and logical objects. A physical object is something that it is possible to stick an adhesive label on (for example), or that could be dropped on one's foot; any logical function, in contrast, is considered as a logical object. For example, while the object that in lay parlance would be called a modem is a physical object, the function thereof is considered a logical object in this model, a logical object that runs on the physical object.

Figure 2:
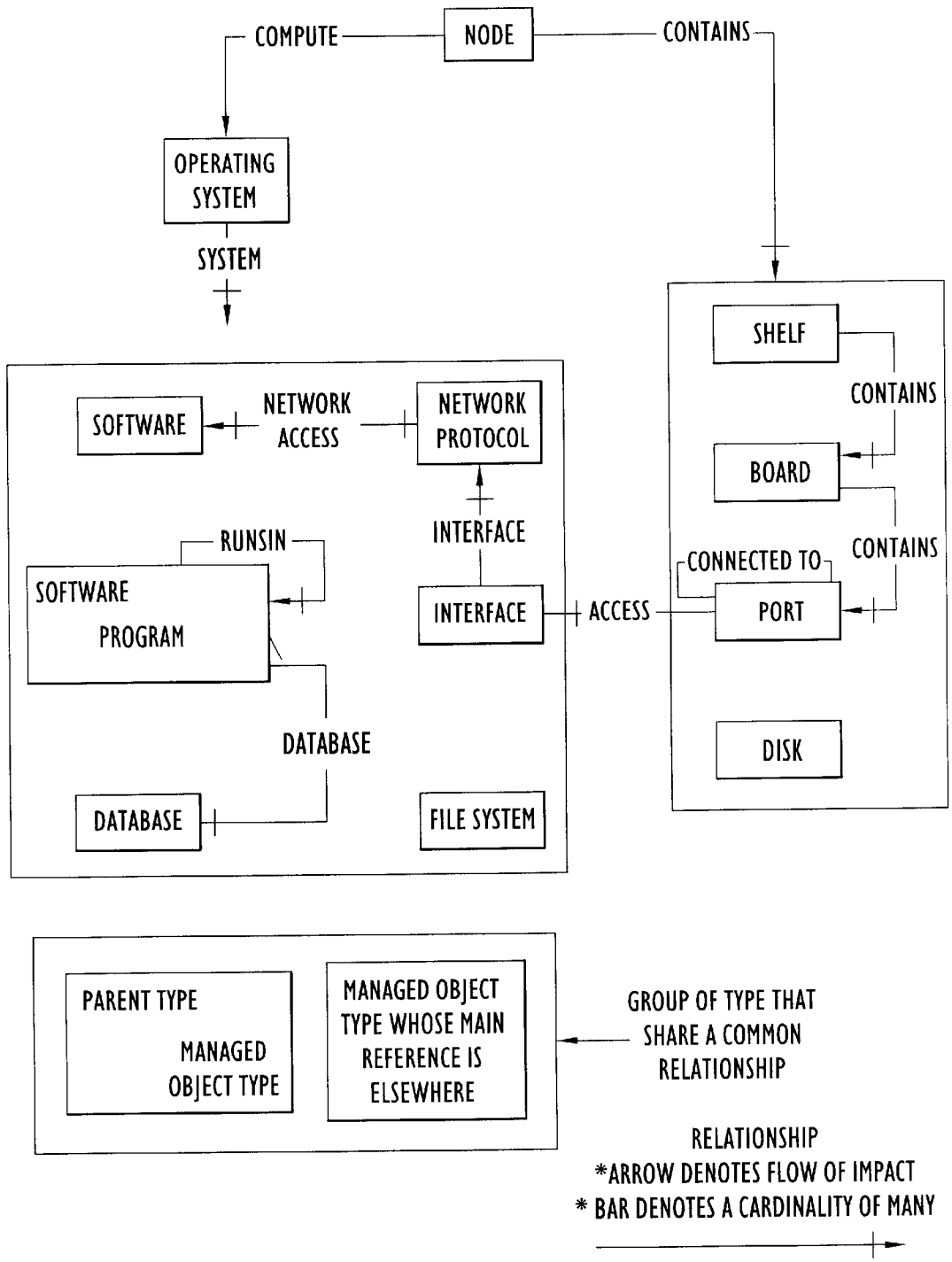
FIG. 2 illustrates one example of a node, and shows the relationship between some basic logical components and the physical components.

The basic level of categorization of physical devices that form the gear of the external system, is termed a "node". FIG. 2 illustrates one example of a node, and shows the relationship between some basic logical components and the physical components. (In that Figure, rectangular boxes denote physical objects, ovals, logical objects, and arrows, services, with the direction of the arrow indicating which component is providing the service to which.) All nodes contain boards, on which sit ports, which enable physical media to transmit information to and from the node. The first logical level above the port is the interface, on which a network protocol runs. The Internet protocol is one example of a network protocol, while Ethernet and token ring interfaces are examples of interfaces. All nodes have operating systems running on them, which OS's provide system services to the interface and network protocol, as well as to programs. One or more interfaces provide interface service to a network protocol, one or more of which provide routesVia services to a subnetwork. A network is a collection of one or more subnetworks.

Examples of nodes include a computer, a hub, a printer, and an Internet router.

Figure 3:
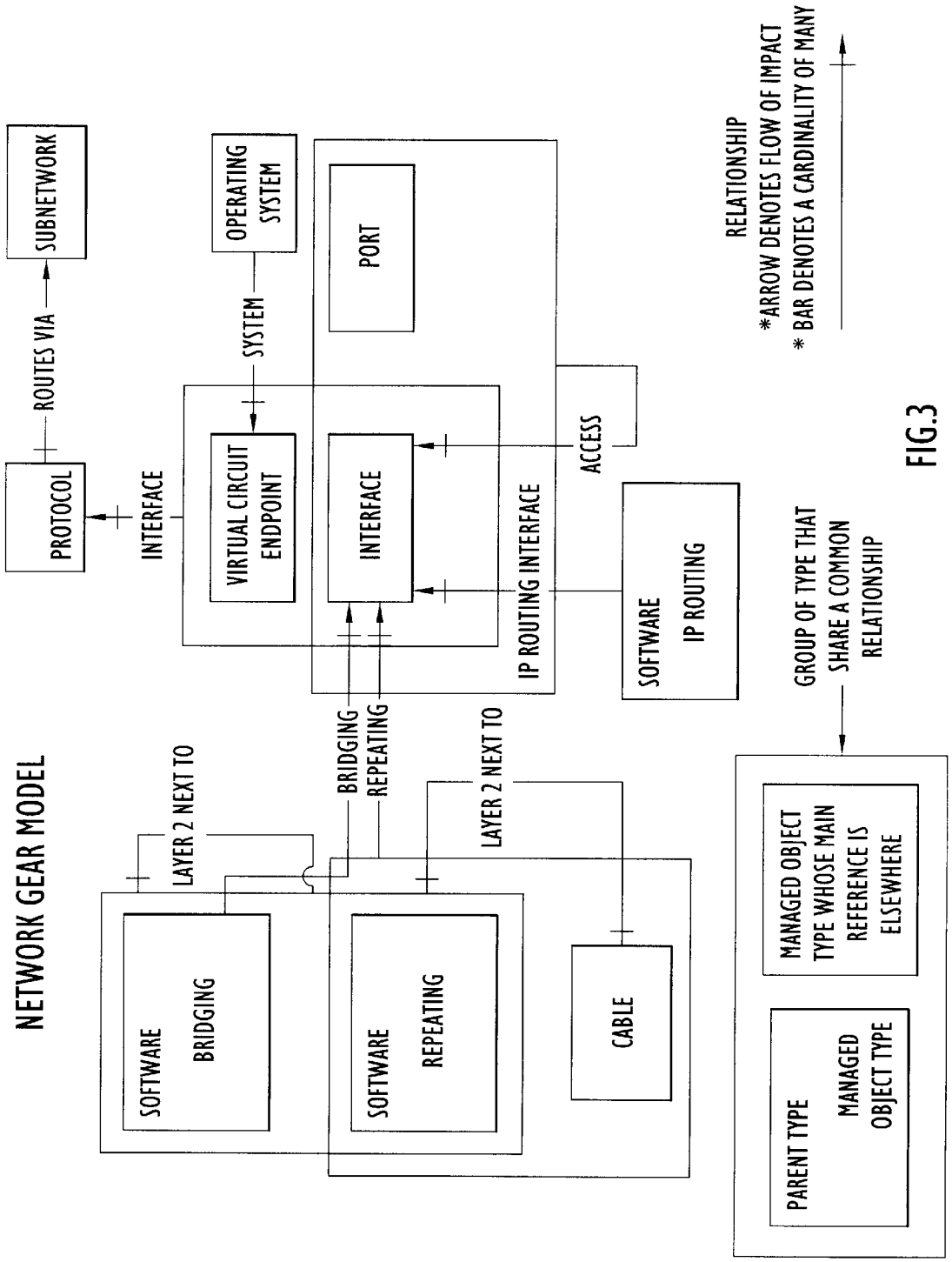
FIG. 3 illustrates a node that is a computer.

A node that is a computer has some additional properties, and offers a more richly varied set of application services than do router or hub nodes (see FIG. 3). Examples of such application services are programs such as database servers and databases. Computers typically contain locally and remotely attached physical disks, which are organized by means of logical file systems.

Managed Objects

Managed objects are constructs of the model. That is, they are not themselves part of the external system, but exist only in the model. MO's are augmented finite state machines that, in some instances, mimic certain interesting behaviors of things in the external system. They are useful artifacts for explaining sets of facts in the external system in a way that is internally coherent to the model. A MO need not correspond to something that the external system recognizes as or considers to be an item or unit, but exists solely because it is deemed useful to the model. For example, a MO might very well be created to correspond to a seemingly random grouping consisting of a particular printer, a particular database and a particular LAN hub. According to the preferred embodiment of the invention, MO's can represent users of the external system, business work groups or other organization entities that use portions of the external system.

It may be useful at this juncture to emphasize that the term MO is not used herein in exactly the same way as defined in the CIM (where "MO" refers to the "actual item in the system environment that is accessed"). That is, a MO in the CIM sense is directly referential (refers directly to something in the external system that existed before being incorporated into that system), and is a proxy for that entity. A user or application interacts with the object in place of interacting with the underlying entity itself. In the present invention, on the other hand, a MO is only indirectly (if at all) referential. The model itself represents the interrelated system of devices and applications that make up the external system; there is not necessarily any exact analogy in element-to-element relationships, however, because not all elements recognized by and making up part of the external system need to be in the model, nor are all elements in the model things recognized as entities by the external system. Mo's in the present invention are constructs of the model—that is, are defined in terms of their function within the model—rather than constructs of the external system that are represented in the application. In typical CIM modeling, if the state of an existing MO changes, the model knows of that change directly. In the preferred embodiment of the present invention, in contrast, if the state of an existing MO changes, the model learns of that change through an agent (discussed below) which has captured or deduced the change, packaged it into a message, and sent the message to the model, and thus allowed the model to respond to the message.

This approach provides three advantages:

1. The model can contain representations of resources that do not have the proper instrumentation to interact directly with a proxy in the model but information concerning the performance of which can be derived through inference (e.g., a passive hub);
2. The representations in the model can be changed independently of the things they represent (e.g., the types of information present in each MO, or in some MO's, can be redefined during runtime, thereby creating a new model in place of the old one, without having to interrupt the running of the model program, or having to restart or reinstall the software; this flexibility is an important feature of the preferred embodiment); and
3. The model can accept systemic events—for example, the addition of a new MO, the loss of an existing one, or an equipment upgrade in an existing component of the external system—that cannot, by definition, have a MO as a proxy.

This approach, thus, provides the preferred embodiment with the ability to represent all objects and relations that could be represented using the CIM approach, and a large number of others that are not and cannot be accommodated in CIM.

Services, Sessions and Paths

A service, as the term is used herein, is a labeled, directed relationship between specified MO's. Services may be either computational or functional. Computational services are those which exist to create the fabric of the computing ensemble (the external system), for example, services performed by the OS in a computer node, opening and closing files, controlling a display device or a printer, etc. (In other words, computational services are those that serve to construct an effective distributed computing ensemble regardless of any use that the owner of the system might put it to.) Functional services are those which exist to satisfy the needs of higher-level objectives (not necessarily computational ones)—for example, getting data from a database to learn the number of tomatoes consumed per capita in Paraguay over the last five years. Functional services correspond approximately to a naive notion of "session" (that is, involve a coordinated exchange of information between nodes using conversational techniques).

It must be realized that there may not necessarily be only a single relation between two MO's. A single pair of MO's may have multiple service relations between them. They may each provide one or more services to and consume one or more services from the other. For instance, an operating system could provide both file system service and runs service to an application. And a given service need not always behave in the same manner. For instance, assume that a router delivers data that is destined for video application V as well as for financial market data information application M. V can function perfectly adequately with a loss of 5–10% of packets; M cannot. The preferred embodiment of the invention distinguishes these two tolerances in terms of service expectations. Thus, the service relation between the router MO and the MO corresponding to application V is not the same as that between the MO's corresponding to the router and application M.

A path is the set of MO's that offer the necessary intermediary computational services to realize a functional service. It should be noted that a functional service is decomposed into lower-level computational services; computational services, on the other hand, implement functional services. Suppose, for example, that a distributed database server needs to receive requests from its clients and return result sets to them. To receive remote requests, it needs to make use of intermediate network facilities connecting it to its clients. In terms of the model, we say that the database server MO needs "networkAccess" services from a MO on the same node. If the IP network protocol MO on the database server's node offers networkAccess services, there is a match. The IP MO, in turn, needs interface services from a network card on the same computer. If the network card MO on the computer offers interface services, there is a match. And so on all the way down the chain of connections that deliver network services to both database and client, and ultimately allow there to be a session between them. The path is the chain of functional connections that allows delivery of services.

If the model were to realize and display simultaneously all such service relationships, the result would be a snapshot of the internetworked MO's at that moment, i.e., a map of the paths of the network at that moment. In the terms of the present invention, the model is an emergent property of MO's and services, and is not itself the main focus of what is being done.

It should also be noted that functional services and paths vary independently of each other. For example, suppose that a client application $client_A$ connects to its server "$server_X$" via IP, while another application $client_B$ connects to the same $server_X$ via the Internetwork Packet Exchange protocol ("IPX"). Both receive database service from the server. Since a path is a concatenation of computational service links, by definition one path is determined by service "IPX service", the other, by service "IP service", and so the two paths are different.

Again, suppose that a database-using application runs on a mobile computer. When the computer is at its docking station, the application converses with the databases through the LAN using synchronous IP protocols. When the computer is away from the desktop, the application converses with the databases through asynchronous store-and-forward queues that are realized over a dial-up point-to-point protocol connection. As far as the application is concerned, it expects and receives the same database service, and yet the path over which the service is realized, is quite different.

The same point can be considered informatively from the viewpoint of the lifecycle of information within the invention. Paths are a necessary concept for computing the impact of physical and lower-level logical failures on higher-level services. Services, on the other hand, categorize the kinds of relationships that make up the system at increasing levels of abstraction. Services, therefore, create a dimension of impact analysis from differing perspectives. For example, suppose it is desired to know how reliable database service is for some given set of disparate users. Categorization by service allows the model to cut simply across different database service providers and to provide an aggregation of both fault and impact data for that service.

Faults, States, Events, Anomalies and Performance Degradations

Any detected change of an individual managed object's state to some undesirable value is a "fault". (A MO's state is simply the set of values that its various attributes have.) An event is a representation of a fault in the model, or of the inverse, a recovery from a fault.

Many resources (parts of the external system) report their faults, whether through spontaneously recording to a log, emission of traps of the type provided for by the Simple Network Management Protocol ("SNMP"), or in response to an active request for information on performance. Some resources, however, are not constructed with the ability to report their own state spontaneously, and are not instrumented to respond to a polling request or the like; this necessitates fault inference. What this means is simply that the model infers that a fault exists. Passive monitoring techniques such as pinging a task or device, give the barest of information, essentially only whether the task or device is still running in the system.

Performance metrics offer another source of information. By analyzing such data with a variety of statistical tests, it is possible both to anticipate faults and to interpret skew conditions as faults. Such analytically-inferred or anticipated faults are termed "anomalies".

In addition to actual faults, and anomalies, performance degradations are also of interest. These are changes in the state of external system resources that hinder, but do not destroy, the ability of themselves or other parts of the external system to perform their required tasks.

Impacts

Faults and anomalies are adequate for component management because they report on the health of each component of the external system taken in isolation ("component" here is to be taken broadly, including either hardware or software, but always refers herein to an element of the external system). Service-oriented management also demands knowledge of impacts. An impact is the description of a disruption in service for some portion or user A of the external system owing to a correlated disruption in service of some portion B. For instance, a database suffers sympathetically if a business application cannot reach it owing to router failure. More simply, the router fault has an impact on some database sessions. The external system itself is unaware of the impact. Rather, the known relevant information (i.e., after all the other extraneous information is stripped away) is likely to be:

The router registers a fault through an SNMP trap.

The application may register a fault in that it cannot receive data—or the end user will telephone either application support or database support to complain.

The database probably registers no problem.

Database support needs to know about impacts as well as true database faults (disk full, program crash, etc.). If there is no use of the concept of impact, then when an affected user calls database support, the support person is likely not to know of the problem and will have to begin a second effort researching current conditions. If an operation system determines impacts, on the other hand, then the database administrator will have received information that a malfunctioning router may be hampering some users' database access, and can anticipate users' calls.

From the foregoing, it will be clear that the ability to manage impacts presupposes the reporting of faults, as well as the ability to correlate disparate fault reports (events). Impacts, as used herein, are the outcomes of applying some reasoning system to a directed graph of known faults.

Figure 4:
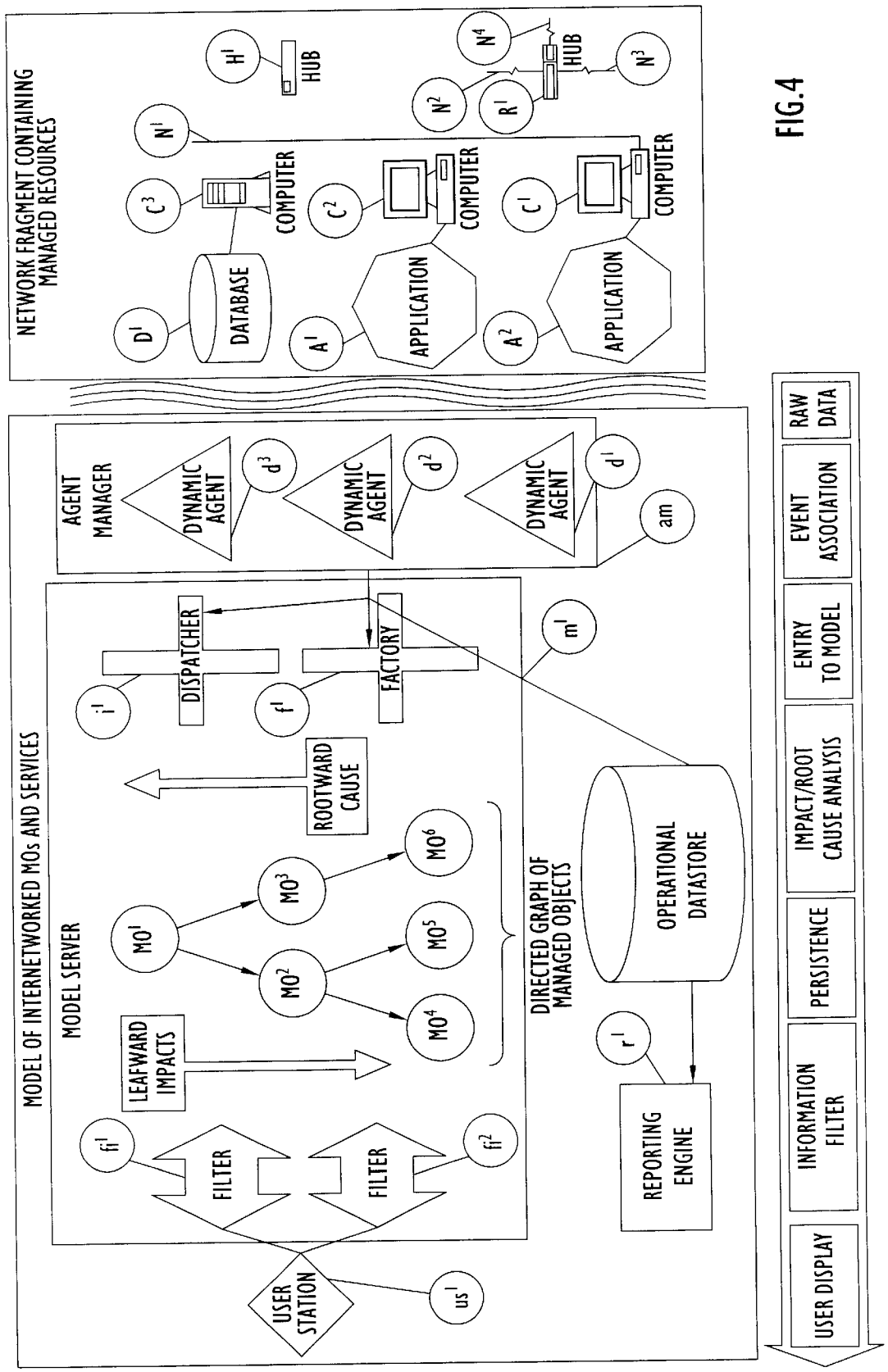
FIG. 4 provides an illustration of the overall flow of information in a model constructed according to the preferred embodiment of the present invention.

FIG. 4 provides an illustration of the overall flow of information in a model constructed according to the preferred embodiment of the present invention. That Figure includes both a partial view of the external system (the "Network Fragment" in the right-hand portion of the Figure) and a portion of the model.

Incidents

During the course of normal operation, managed resources (the elements or components, including both hardware and software, of the external system) suffer faults and performance degradations. New managed resources join the external system, others leave the system, and others change their configuration relative either to themselves (e.g., an equipment upgrade) or to other resources in the external system. All these systemic occurrences will be termed incidents.

One main purpose of the invention is to convey information spontaneously about incidents that affect any end user's set of interests. A user's interests are defined by a set of managed objects, as well as by the functional perspective the user has on that set (e.g., business user, administrator, or application support). To accomplish this goal, the model must reflect each such change to the external system or the resources comprising it and present that information to the relevant user(s).

Several stages of processing must occur in the invention to allow for such reflection. The invention must incorporate the following stages in the lifecycle of information:

1. Raw data: Learn of all incidents.
2. Event winnowing: Analyze the information received to determine whether that information indicates
   a change of state to a MO that must pass to the model,
   performance data to store for later examination, or
   just "noise" to discard.
3. Event association: Convert the representation of interesting events into the model's own event formalism so that it can act on them.
4. Entry to model: Determine if the event marks the addition of a new MO (and if so, inform the MO Factory component to construct the new MO), or a change to a known managed resource (and if so, inform the Dispatcher component to notify the corresponding MO of the event, or performance metrics about some managed resource, and inform the Operational Datastore component to insert this new material).
5. Impact/root cause analysis: Determine the systemic, or contextual, significance of condition-changing event(s) (that is, determine the effect on the condition of the overall system that results from the specific event).
6. Persistence: Store persistently a completely associated set of events that it has categorized as an alarm.

7. Information filter: Organize and categorize information about which MO's have changed state either of their own accord or sympathetically to ambient conditions, filtered according to user interests and entitlements.

8. User display: Make the fact of change, and the information as to whether it occurred of the MO's own accord or is a sympathetic reaction, available to its viewers according to preselected (but redefinable) groups of MO's (business units, for example).

Steps (1) through (3) are performed by the data-gathering infrastructure, while steps (4) through (7) occur in the model and related components, an step (8) is performed by the display system.

Network Fragment Containing Managed Resources

Figure 5:
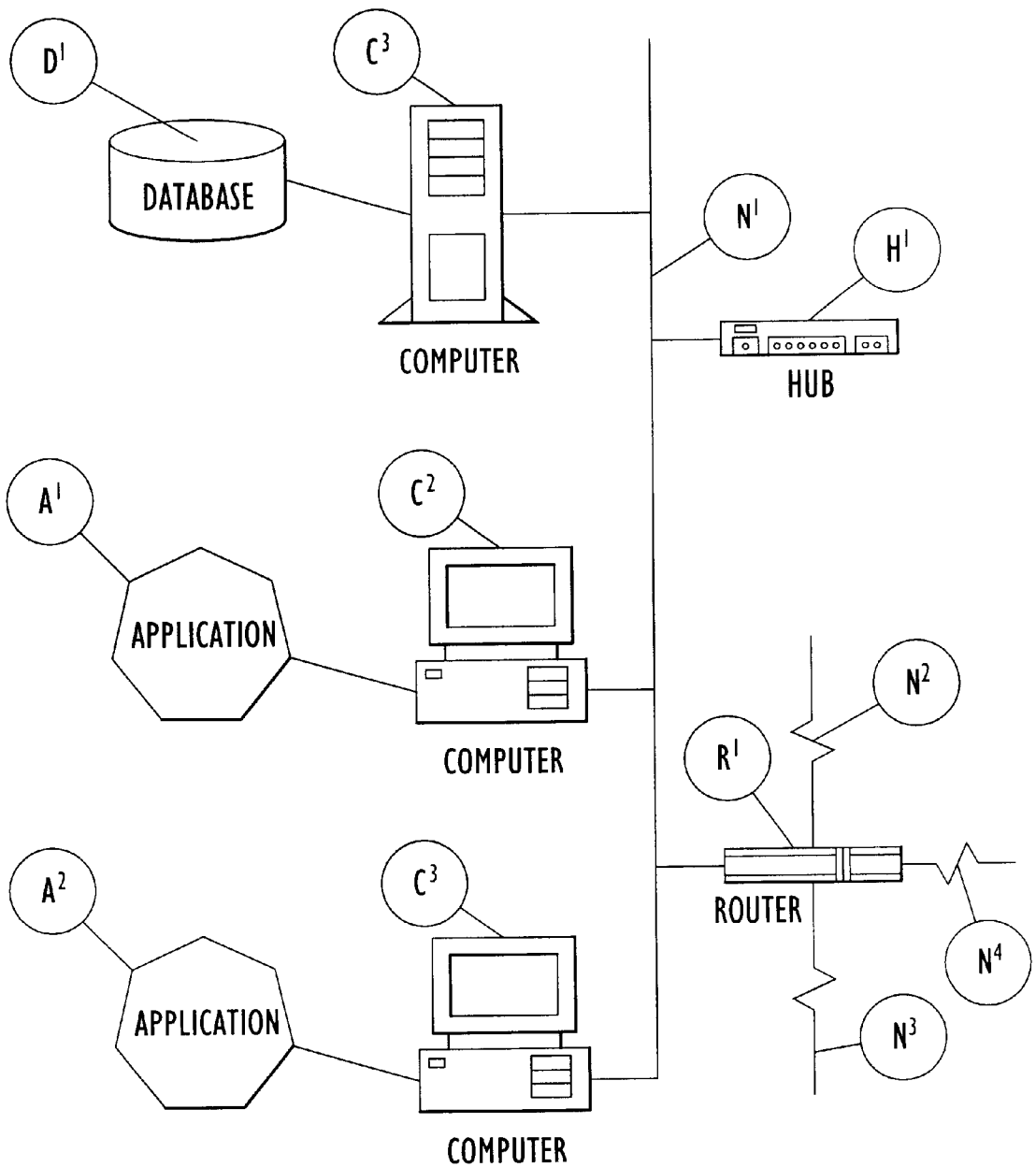
FIG. 5 shows a detail of the system fragment illustrated in FIG. 4.

As described above, the model monitors the operation of, and faults occurring in, the set of managed resources that constitute the distributed computing ensemble (the external system). A fragment thereof, shown at the right in FIG. 4, is shown enlarged in FIG. 5 (Diagram 4). This exemplary fragment contains a network $N^1$, to which are connected a router $R^1$, a hub $H^1$ and three computers $C^1$, $C^2$ and $C^3$. Database $D^1$ runs on computer $C^1$. Applications $A^1$ and $A^2$ run on computers $C^2$ and $C^3$, respectively. Router $R^1$ also connects to networks $N^2$, $N^3$ and $N^4$.

Figure 6:
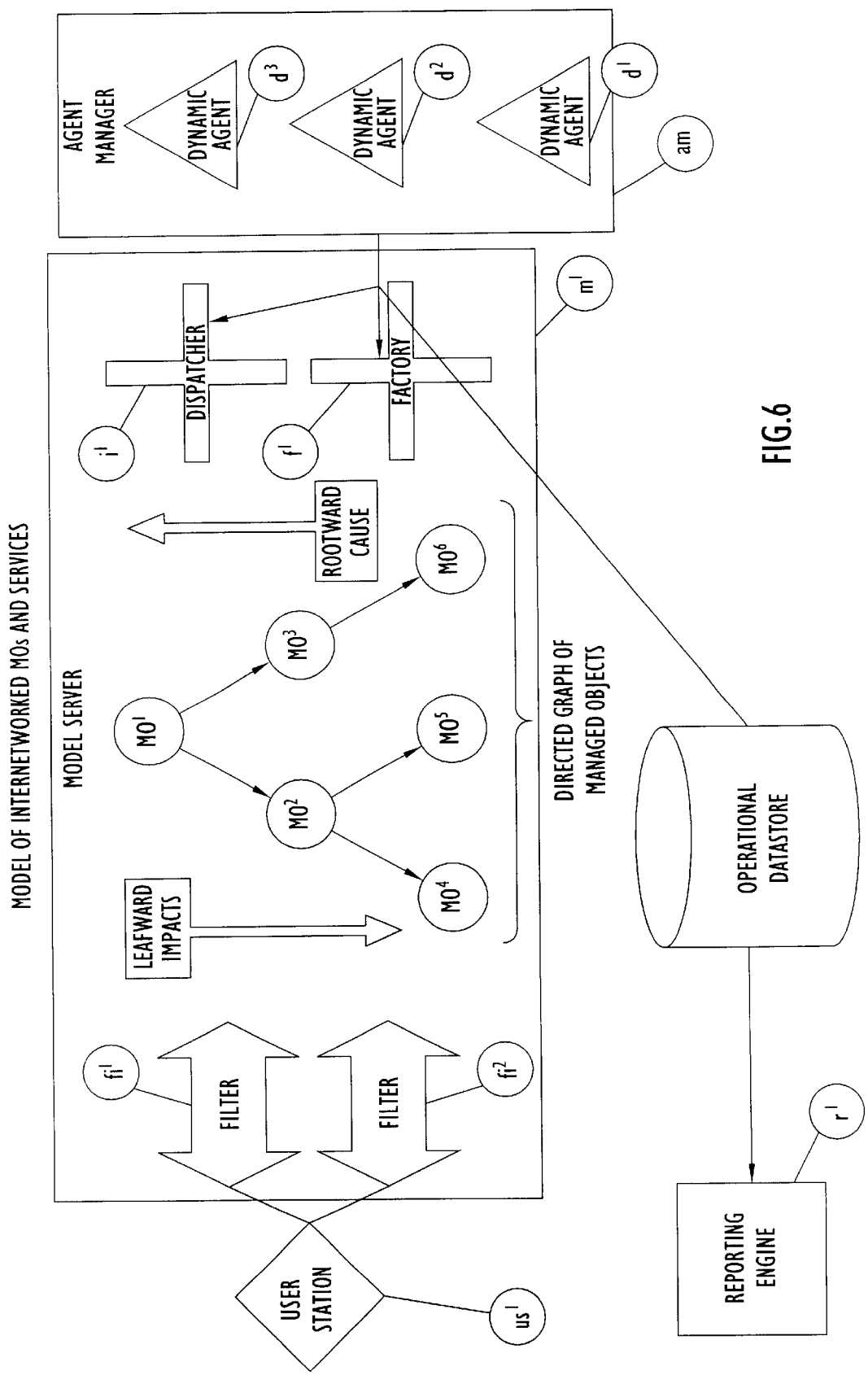
FIG. 6 provides a high-level perspective of how events can take different paths from the agent manager to further processing.

FIG. 6 illustrates a portion of the preferred embodiment of the invention. The two subcomponents illustrated here are an agent manager and the model server.

An agent manager (of which any required number may in principle be provided) contains multiple dynamic agents ("mobile" programs to perform specified tasks), indicated here as $d^1$, $d^2$ and $d^3$. An agent manager may exist without any dynamic agents in it, or may contain up to some specified maximum number (in the preferred embodiment, this limit is 64; the invention is of course not limited to this value). These dynamic agents use such known mechanisms as file tailing, SNMP polling and SNMP trap receiving to monitor the managed resources in the external system. Monitoring amounts to performing two activities:

(1) capturing messages that devices or applications in the external system have emitted spontaneously; and (2) collecting performance metrics of applications or devices in the external system.

The desired result of monitoring is:

to recognize the onset or termination (hereinafter sometimes termed the "offset") of faults by interpreting the messages a device or application has emitted; and to detect the onset or offset of anomalous behavior by performing quantitative analytic tests against performance metrics.

Dynamic agents formulate the results of their analysis in terms of formal message objects of the model (events), and return those events to the model (this process of event return is explained in section relating to the data-gathering infrastructure, below).

FIG. 6 provides a high-level perspective of how events can take three different paths from an agent manager to further processing, by either the model server or the Operational Datastore, depending on the event. More detail is given in the following paragraphs.

Figure 7:
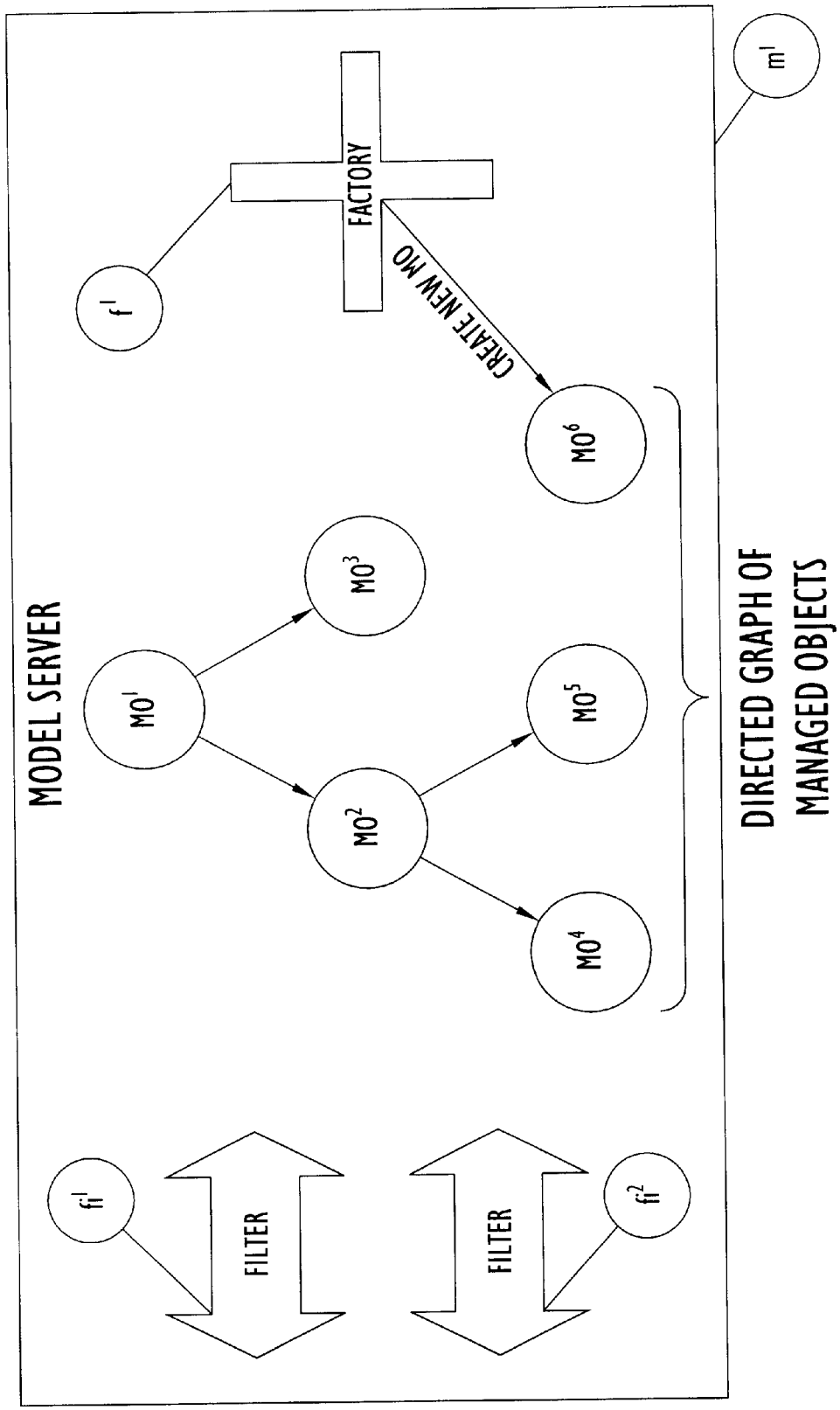
FIG. 7 illustrates how events that report the discovery of some new managed resource are directed to the factory process.

FIG. 7 illustrates how events that report the discovery of some new managed resource are directed to the Factory process, $f^1$ of model server $m^1$, which then generates a new MO for the model, in this case $mo^6$. That is, if an event enters the system for a managed resource for which there is no corresponding MO, Dispatcher $i^1$ notifies the Factory $f^1$ of the need to create a new MO.

Figure 8:
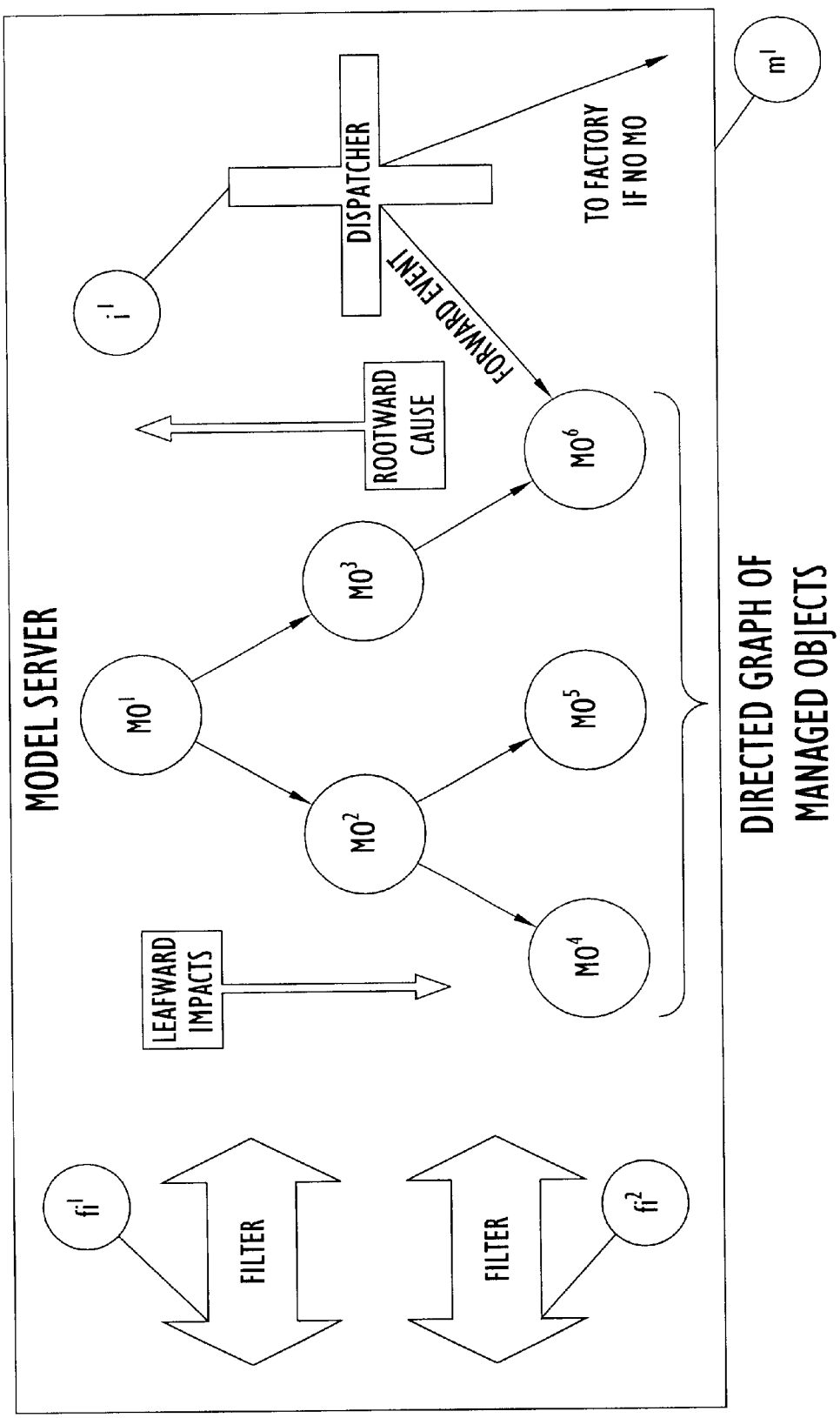
FIG. 8 illustrates how events representing reported and detected faults go to the Dispatcher component of the model server, which then directs the event to the corresponding managed object.

FIG. 8 illustrates how events representing reported and detected faults go to the Dispatcher component $i^1$ of model server $m^1$, which then directs the event to the corresponding managed object, in this case $mo^6$.

All performance data, including data that shows no detected anomaly, goes directly to the Operational Datastore ods from which a reporting engine $r^1$ is able to derive reports to fulfill users' needs.

In the preferred embodiment, all MO's adhere to a publisher-subscriber pattern. In such a pattern, one dedicated component takes the role of a publisher, and all components dependent on changes in the publisher are termed its subscribers. The publisher maintains a registry of its current subscribers. Whenever a component wants to become a subscriber, it uses a subscribe interface, offered by the publisher. Whenever the publisher changes state, it sends a notification to this effect to all its subscribers, which in turn retrieve the changed data at their discretion.

In the present invention, a MO is said to publish a state change it has undergone to its dependents (i.e., the list of MO's that subscribe to it), and is said to subscribe to the state changes of all its supporters (i.e., the list of MO's it subscribes to). All MO's have at least one relation with at least one other MO, which relations can be thought of as a "tree-like" graph whose nodes are the MO's and whose edges are the publisher-subscriber relations among those MO's. Each of those graph edges is thought of as a vector (i.e., has a direction), pointing from the supporter (publisher) to the subscriber.

The messages MO's pass to one another in their publisher-subscriber relationships are state changes that result from a MO's receipt of an event. In the preferred embodiment, that is, a change in a MO may result in a corresponding change in one or more of that MO's subscriber MO's. These changes, in turn, may result in changes in still other MO's. In effect, the model traverses the directed graph referred to above, starting from the MO corresponding to the resource from which the occurrence was reported, to the edge of the graph in what may be termed the "leafward" direction, that is, in the direction from parent (publisher) MO to child (subscriber) MO. In addition to this, however, the model also traverses the graph in the other direction ("rootward"), to find other MO's that may have undergone state changes. Of particular interest here are root-cause events, that is, events that inherently are basic faults themselves, and not just sympathetic events, the consequences of other events. (Those types of events which are treated as root-cause events are listed in a table in the Control Repository.) The encountering of a sympathetic event indicates that the rootward traversal is still navigating intermediary points.

Thus, rootward traversal moves processing toward a root cause, and leafward traversal towards systemic impact.

Suppose that a disk drive connected to a computer node fails in the external system. Applications depending on the drive will stop functioning also. Both the disk drive and (probably) the applications will emit error messages. In the model of the preferred embodiment, the disk drive MO receives a message indicating an event that is inherently a root-cause event (the disk drive failure), and emits a state change message to its dependents, including the MO's for the applications in question. The application MO's consequently change their state. In this case, the model is predicting that the applications will feel the impact of the disk drive failure, and the invention labels the application MO state changes as impacts.

Suppose further that a dynamic agent independently captures a report emitted by one of the applications about its inability to gain access to needed data (for example). Within the model, the MO corresponding to that application receives a message indicating an event that is inherently a sympathetic event. It searches for an associated root-cause event by searching among those MO's supporting it for any that holds a root-cause event (i.e., for any that has received a message indicating the occurrence of an event of a type that is inherently a root-cause event). In this case, the model is corroborating the impact it has predicted. More importantly, the model is associating apparently disparate sympathetic events by associating those events with root causes, in a rootward traversal. If no root-cause event is found, the operator cannot, of course, be given a clear identification of the basic problem, but can still be provided with the enormously useful information as to which of the various incoming events are related to each other and what their likely impacts will be. In addition, the identification of the MO's that are involved in such a group of related events will likely facilitate the eventual identification and cure of the fault. The cluster of such events is termed an alarm. (If the cluster does not contain a root-cause event, then the cluster is said to be a proxy alarm, until such time as a root-cause event is reported.)

Suppose, for example, that multiple nodes in a given portion of the model receive apparently independent events that are in fact due to the same underlying cause. An alarm is the abstract container of all associated root-cause events. The alarm is also the primary unit of display of what is going on to the administrator. Using alarms constrains the flow of information to the administrator using the invention, and thus allows the administrator to focus on the root cause rather than on all the varied presentations or manifestations of it.

A viewer other than a system administrator (e.g., application support, an IT manager or a business user) has a different basic level of categorization of events than the administrator does. The general rule is that the viewer's basic level of categorization is the focus of that viewer's interest. For the administrator, that is the root cause; for application support, that set of applications she is responsible for in a given deployment context; for a business user, that set of resources she interacts with directly (applications, printers, etc.). The impact is the alarm equivalent for non-operational perspectives—that is, while the operator is interested in the alarm (which is handled in such manner as to direct attention to the root cause), the impacts are handled in such manner as to present to other users the information of most interest to them.

Alarm Creation

Figure 9:
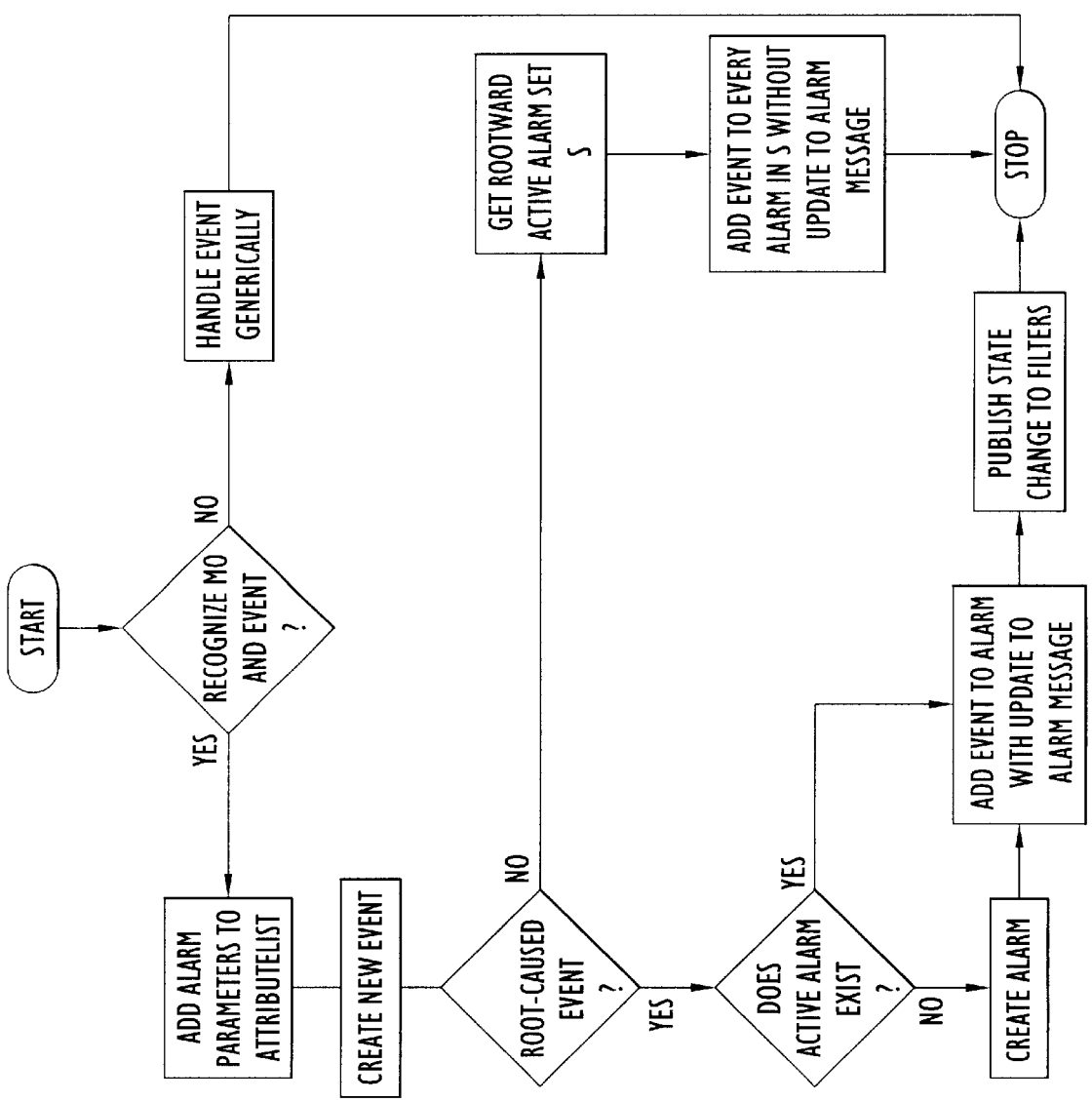
FIG. 9 illustrates the lifecycle of an event from the model server Dispatcher process to alarm formation.
Figure 10:
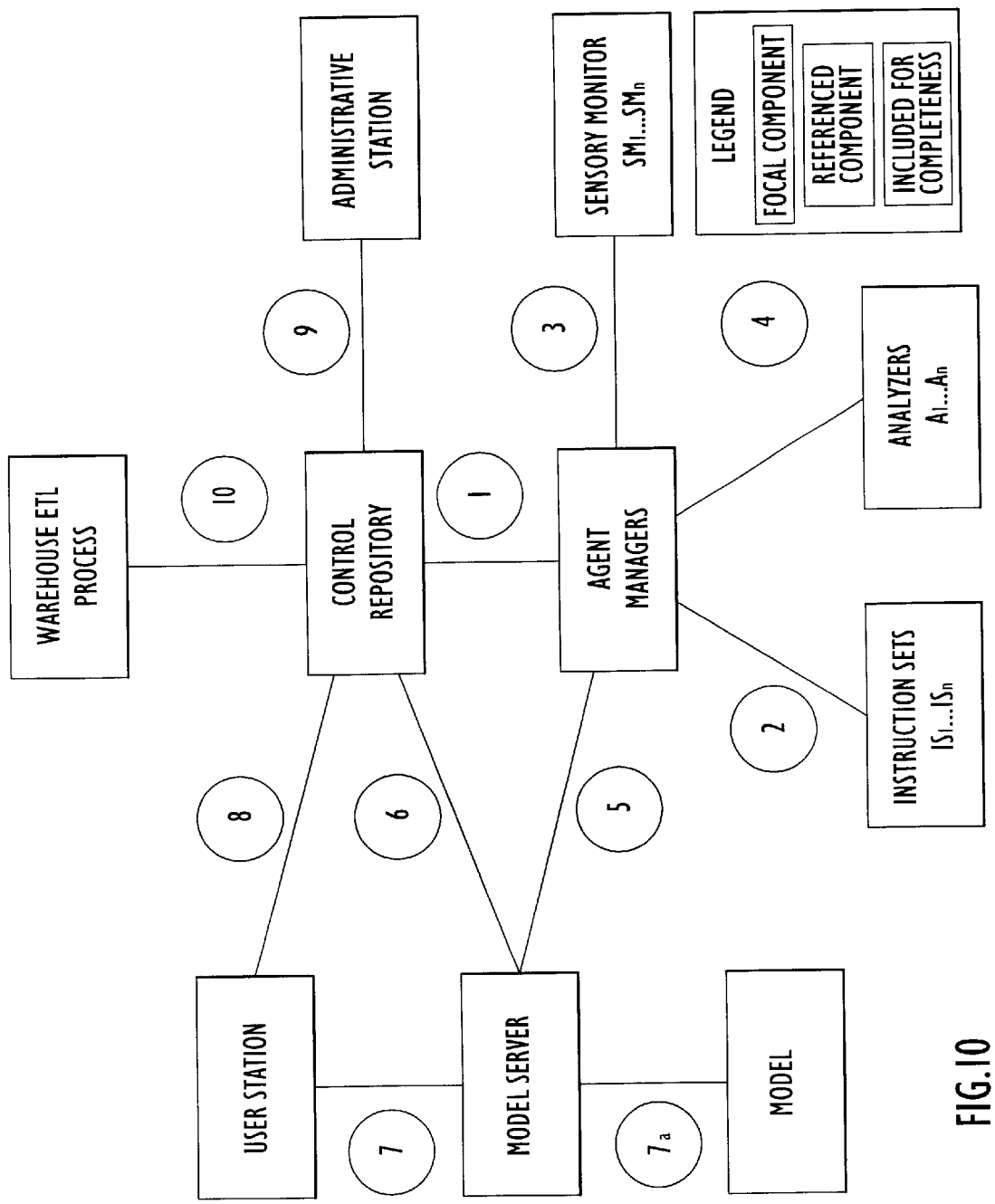
FIG. 10 illustrates conversations among various functional components of the preferred embodiment.

FIG. 9 illustrates the lifecycle of an event from the Model Server dispatcher process to alarm formation. As shown, a MO passes messages about its state changes to MO's that depend on it (leafward traversal), or on which it depends (rootward traversal). Rootward traversal terminates when it encounters a node (MO) with a flag set that indicates that the latter MO has received a message indicating a root cause. Leafward traversal terminates on exhaustion of the tree (i.e., when there are no more leafward nodes to go to, traveling along the relationships from the root-cause MO). The collection of sympathetic leaf events and their underlying root-cause event together create an interaction history known as an alarm. The description of the root-cause event labels the alarm.

The Dispatcher receives a reference to an event from the Control Repository, values to fit into that frame, and a reference to a MO. If the Dispatcher does not recognize both the MO and the associated event, alarm processing is finished. Either the Factory needs to create a new MO or the model server needs to log that it has received an unknown event. Otherwise, the MO constructs the event by fitting the parametrized data that it has received into the event frame it has retrieved from the Repository.

If the event is not of a type that is ordinarily a root-cause event, then the MO checks against its set of active supporters and adds the event to any active alarms in that set.

On the other hand, if the event is one that is ordinarily a root cause, the MO checks to see if it has an active alarm. If not, it creates an alarm; otherwise, it adds the event to an existing alarm, and the text of that alarm is changed to reflect that the root cause has been identified.

The addition of a new alarm or an update to an existing one causes publication of change of states to all objects that subscribe to alarms (filters, which are discussed below).

Filters and Displays—Getting the Information to Users Processors called filters, represented in FIG. 4 as $fi^1$ and $fi^2$, are sensitive to alarms according to configurable criteria. Each filter stands in subscriber relationship to a given set of MO's. In essence, a filter is a set of inclusion criteria for selecting MO's with which the given set of MO's should enter a subscriber relationship. In their role as subscribers, the filters receive messages when alarms associated with MO's in their inclusion-list change state. The filters then alert the view applications of user stations ($us^1$ and $us^2$ in FIG. 6) of the alarms. The view applications sit in a subscriber relationship to their filter, which publishes its own state change, i.e., a new alarm (or a modification of an existing one), to the viewer applications. When the viewer application receives the update message, it updates its display. The user can double-click on the alarm display to see the underlying events behind the alarm. The exact arrangement of this display is not critical, as long as the user or operator seeing the display is provided with the requisite information about what is happening.

The Data-Gathering Infrastructure

The data-gathering infrastructure of the preferred embodiment is a flexible, reusable provider of data collection and distribution services. This infrastructure is entirely independent of the model logically, functionally and in code base. Both infrastructure and model, however, are parts of the preferred embodiment. The description that follows is of a computational mechanism that has multiple functional uses within that embodiment.

The three main uses in that embodiment are:

discovery of things in the external world, where the customer of the information is the MO Factory component;

collectors of information about the conditions of things in the external system, where the customers of the information are the MOs; and collectors of information about things in the external system, where the customers of the information are the end users of the preferred embodiment.

These are not the full range of possible uses of the infrastructure, but simply representative uses.

Main Purpose of the Data-Gathering Infrastructure

The model contains relatively little knowledge about the things that make up the external system, and most preferably has as little such knowledge as possible, knowing only the kinds of relationships the components of the external system enter into. To get that information, the model must rely on the infrastructure, which does have the requisite abilities. The infrastructure takes, as input, aspects of the essential characteristics of the things themselves (the intensions), and produces as output aspects of the external characteristics of those things (the extensions). The model thus requests services from the infrastructure. The infrastructure does not need to know anything about the model's implementation— it only needs instructions of what to collect and what to emit. Enterprise management, consolidated financial data feeds and messaging services are just some examples of possible models that could take advantage of the identical data-gathering infrastructure, differentiated only by the specific instructions it follows (that is, the data-gathering infrastructure has many applications other than with a model of a distributed computing ensemble, as in the preferred embodiment, and this aspect of the invention is not limited to use of the infrastructure with such a model).

Goals of the Data-Gathering Infrastructure

Some particular goals that are achievable using the architecture:

24 hour a day, seven day a week availability;

extreme flexibility in dynamic configuration and reconfiguration;

fault tolerance of data collection;

independence of the infrastructure from the model;

parallel processing of data collection;

distributed location of data consumers (i.e., multiple model instances);

ability to cascade information emitting from data collectors;

seamless availability across multiple platforms;

ability to execute user-provided stored procedures in both ad hoc and programmatic contexts;

high throughput;

authentication and authorization security; and easy extensibility to new environments and models (i.e., a portable infrastructure pattern that can be reused) seamlessly for, say, models of factory flow).

Structural Components of the Data-Gathering Infrastructure

The main housing of the data-gathering infrastructure is the Agent Manager. An Agent Manager is an application written in Java, and runs as a stand-alone address space.

There are seven first-order components of an Agent Manager in the preferred embodiment. Four of them are intrinsic components, by which is meant that the rationale for their existence derives from demands of Agent Manager processing itself. The other three are extrinsic components, that is, components whose rationale for existence derives from demands placed on the Agent Manager by the macroarchitecture of the preferred embodiment.

An unspecified number of dynamic agents (from none to an architecturally unlimited, but practically limited number) may run in the same Agent Manager address space. To host dynamic agents, Agent Managers need additional components that fall into three categories:

control communication with other address spaces; information communication with other address spaces; and internal housekeeping.

The Agent Managers function as the gateways into the main processing area of the model of the preferred embodiment. The primary function of the Agent Managers is to perform a preliminary analysis of uninterpreted (raw) data.

Such data can arise from two sources:

1. the managed resources report their own condition spontaneously through such mechanisms as recording messages in system logs or emitting SNMP traps; and 2. some intermediary agent infers the condition of the managed resource by observing its external behavior (e.g., CPU consumption, packet loss rate) that are detectable through such mechanisms as polling of SNMP Management Information Blocks (MIB's), or retrieving system management metrics from the control blocks of the relevant OS.

Preliminary analysis by an Agent Manager results in three possible outcomes, in which the data can indicate, respectively:

1. that some change of state has occurred to a known MO (either a shift from normal to anomalous behavior, or a return to normal);

2. that the model should create a new MO to represent a previously unknown managed resource; or 3. that a known MO is behaving appropriately, and its performance data should thus just be recorded.

Broadly speaking, the function of the Agent Manager is to analyze the uninterpreted data, determine which of these three outcome paths it should follow, format the data appropriately to the particular outcome, and route it accordingly.

The architecture of the Agent Manager comprises non-terminating reactive programs that interact with their surroundings. These programs react to either external stimuli (incoming data from various sources) or internal stimuli (control data from other components of the external system). This control data instructs dynamic agents (described below) about what kind of data to acquire, how to analyze it, and where to pass it. The Agent Manager learns from control data what dynamic agents to stop, start or update.

The control infrastructure of the preferred embodiment follows a data-driven architecture. The implementation of functional components does not have a one-to-one correspondence to address spaces, or even to objects. In some cases, the method of an object might implement the function, while in others implementation may be by means of an independent address space. What is important from the overall architectural standpoint is the set of functions themselves.

Figure 11:
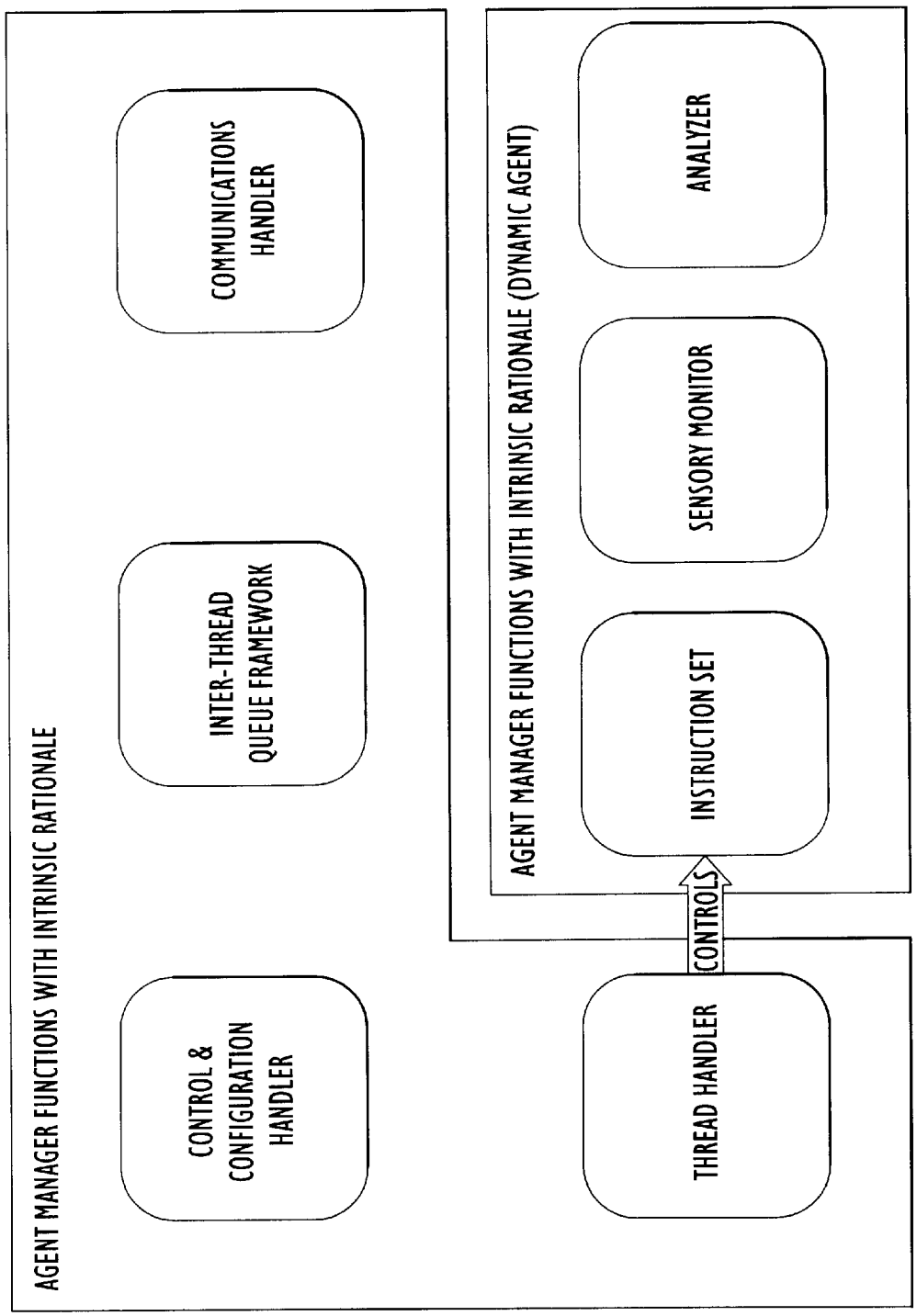
FIG. 11 illustrates classification of the functional components of an agent manager.

The Control Repository provides a central storehouse of control information, which must flow through the system in an appropriate way. This flow of control data constitutes a set of "control conversations" among functional components. These types of "conversations" are illustrated in FIG. 11, and include:

1. Control Repository to Agent Manager: mission packages, bundles;

2. Agent Manager to instruction set: attribute list of parameters;

3. Agent Manager to sensory monitor: attribute list of parameters;

4. Agent Manager to analyzer: attribute list of parameters;

5. Model server to Agent Manager: ad hoc requests, updates of running modules;

6. Model server to Control Repository: requests for bundles to implement ad hoc requests;

7. User station or model to model server: requests for active data, requests for monitor services (ad hoc modules);

8. User station to Control Repository: listing currently available modules (scripts) that can be run, their description and their parameters (it should be noted that in most cases this is likely an indirect conversation mediated by the server);

9. Administrative station to Control Repository: overall model configuration, module insertion, update, reporting, etc.

10. Control Repository to warehouse extract-translate-load: instructions for maintaining roll-up data model based on raw information.

FIG. 11 illustrates the division of the functional components of the Agent Manager into those with an intrinsic rationale and those with an extrinsic rationale. Among the former are: control and configuration handling, inter-thread queue framework, communications handling, and thread handling. Among the latter are control of the instruction set, control of sensory monitors, and control of analysis. These various functions will be discussed in what follows.

Configuration Handler

This function is to receive mission packages and both ad hoc and persistent bundle requests from consumers, and to instantiate those requests from the Control Repository.

Inter-Thread Queue Framework

This function is to provide low-level semaphore, mutex and asynchronous queue services to allow threads to provide parallel processing and object sharing as necessary.

Communications Handler

This function is to provide a mechanism for passing collected information out from the Agent Manager, and collecting information from other Agent Managers, as described below.

Thread Handler

This function is to manage (start up, stop and monitor) child threads that are performing services for the model or other end consumers.

Control Communication

Agent Managers bind to the rest of the data-gathering infrastructure through a series of conversations with neighboring components (these are software components of the infrastructure, and should not be confused with the hardware and software components that make up the external system). In control conversations, software components of the preferred embodiment pass to one another runtime messages or system metadata whose function is to pass control from one point of processing to the next, thus effectively binding the functions of the distributed system together.

The configuration handler subcomponent is responsible for the conversation between the agent manager and the Control Repository. It receives assignments for the running instance of the Agent Manager (data structures called mission packages). These assignments include:

names of the services that the communications handler will use to fit itself into the cascade; and bundle execution data structures, comprising the Instruction Set and Analyzer scripts that dynamic agents will run, and types of SensoryMonitor the Agent Manager needs to start up.

Because the configuration handler accepts external interrupts with control data, its presence allows dynamic reconfiguration of the number, type and assignment of dynamic agent in any given Agent Manager.

Information Communication

In information conversations in the preferred embodiment, Agent Manager components pass the information their dynamic agents have collected to the model. As already mentioned, this passing of information does not need to be direct. The preferred embodiment is organized to allow a cascade of information to enhance load balancing and ensure that dynamic agents run close to their managed resources, and at the same time to diminish the number of direct connections into the model server. In a cascade, Agent Managers are configured in a tiered tree pattern. Only the Agent Managers at the root of the tree pass their information directly to the model server; all others pass to the Agent Manager node in the next level. Each Agent Manager is, then, potentially a passthrough as well as an originator of data. In this way, a heavier stream of data reaches the model than it would with point-to-point connections, but fewer concurrent interrupt points disturb the model's processing. The communications handler subcomponent is responsible for transmitting information messages from an agent manager, and receiving messages coming in from another agent manager lower in the cascade. Communications handlers communicate using CORBA CosEvent channels and find each other through CORBA CosNaming services. These commercial infrastructure components allow agent managers and servers to be in a fully dynamic configuration. Each of these components needs know only the name of its higher node, not whether that node is a fellow agent manager or a server. This can be expressed architecturally by noting that only the information-message-passing behavior needs be exposed to the data collection component, not the intrinsic behaviors of either server or agent manager. Communications handlers have two subcomponents themselves: Inbound and Outbound Handlers. As their names suggest, Inbound is responsible for receiving incoming information from other agent managers, Outbound for passing to the next node in the cascade. Reconfiguration of the agent manager topology is dynamic. An administrator can add new assignments, delete existing assignments or change the behavior of existing assignments of any dynamic agent plant during runtime.

Internal Housekeeping

The first portion of the internal housekeeping functions relates to inter-thread queue infrastructure.

Inter-Thread Queue Infrastructure

The Agent Manager is implemented as a set of parallel processing threads that divide the work of the Agent Manager functionally. Each thread runs according to an "active thread" strategy—that is, each is in a non-terminating main loop that accepts state-changing instructions from external interrupts. Joining the threads are asynchronous event queues and a synchronization mechanism based on waits and interrupts. The set of synchronization techniques is the inter-thread queue infrastructure.

Thread Handler

A mission package contains the configuration information for a number of different Agent Manager functions. When it enters the Agent Manager, some Agent Manager component needs to deconstruct it and disseminate its contents appropriately to the various responsible Agent Manager components. The thread handler is the component responsible for starting the dynamic agents, and thus receives the dynamic agent bundle sections of the mission package. It interprets the incoming information, determines how many threads to start up, and with what parameters, and then enters a monitoring phase in which it waits for either a dynamic agent to end prematurely or a new mission package to arrive.

Dynamic Agents

Dynamic agents are the true data capture component of the data-gathering infrastructure, and so form the bridge between the set of data sources to the model and the model itself. In the preferred embodiment, the data sources are the devices and applications that the preferred embodiment manages (the hardware and software components of the external system).

Dynamic agents are also non-terminating reactive programs that interact with their surroundings. Structural non-termination does not mean that the tasks stay running forever, only that they run until requested to do otherwise. The system requests, for instance, that discovery agents terminate after they have completed their task. The programs react either to external stimuli (incoming data from various sources) or to internal stimuli (control data from other components). This control data instructs the quite generic dynamic agents about what kind of data to acquire, how to analyze it, and where to pass it. The Agent Manager learns from control data what dynamic agents to stop, start or update. Thus, the Agent Manager plays a critical role also in the flow of control data through the system.

Conceptual Architecture of a Dynamic Agent

A dynamic agent bundles three functional components under a single cover: SensoryMonitor, InstructionSet, and Analyzer. Dynamic agents are the metaphoric eyes, ears and nose of the model. Consequently, the dynamic agent component most directly responsible for capturing data is called the SensoryMonitor. The SensoryMonitor collects data through a variety of protocols—SNMP, file tailing, TTY, to name a few—depending entirely on the mechanism most appropriate to the device. The SensoryMonitor is responsible only for knowing how to handle the lowest level requests, not for knowing what requests to issue, nor how to interpret the results.

An InstructionSet is the module function that formulates protocol- and device- or source-specific data-eliciting messages.

An Analyzer is the module function that winnows, interprets and massages incoming information. Most of the knowledge necessary for interpreting the incoming data as impacts must reside in the model proper, since only the model has access to information about how individual events fit into the fabric of the overall managed environment. The Analyzer, however, can perform first-level acceptance testing for messages, and reformat messages into a normalized appearance that the model is able to interpret more simply (i.e., assign the device- or protocol-specific knowledge to a point near the source rather than cluttering up the model with it). From the perspective of the Agent Manager, InstructionSets and Analyzers are exogenous guests running in the dynamic-agent context. Their implementations are artifacts of the control component of the model that pass transparently into the dynamic agent (in what might be thought of as a kind of friendly Trojan Horse strategy). From the perspective of the overall processing of the data-gathering infrastructure, the dynamic agent provides a distributed, possibly remote, run-time context for some behavior of the model. The InstructionSet and Analyzer expose only their external behavior to the Agent Manager, and do not need to make their implementation known in any way to the Agent Manager. While the InstructionSet and Analyzer work on behalf of the model, their instructions are mainly uninteresting to the runtime model. They come rather from the repository instantiation of the model. The particular implementation of the modules is immaterial to the functional division of labor. The components could all be bundled together as synchronous calls to the same class, as methods of multiple classes, or split into parallel threads. The architecture will support multiple implementations as suits the particular context at hand.

Figure 12:
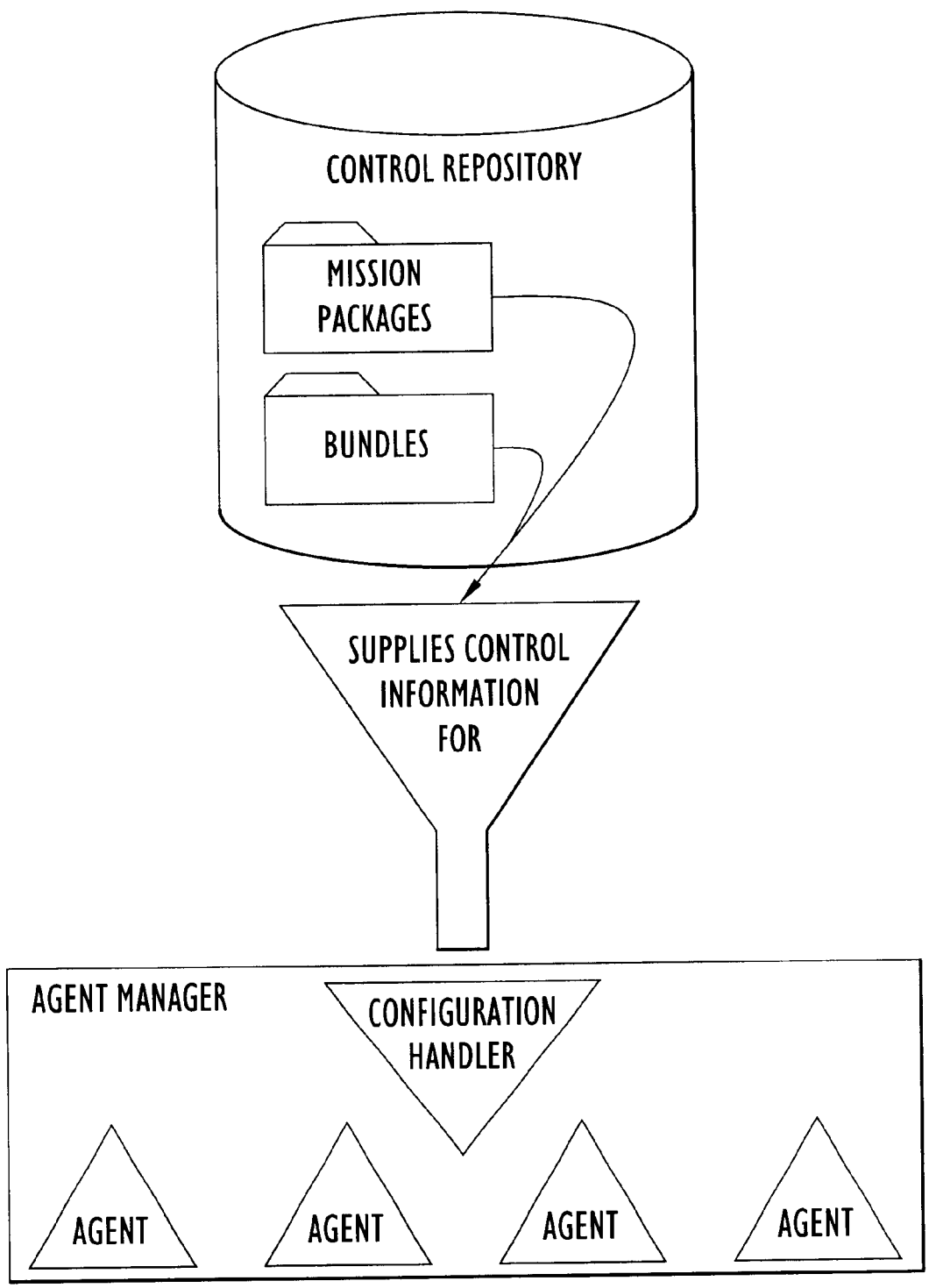
FIG. 12 is a schematic illustration of making an agent manager and dynamic agents data driven.
Figure 13:
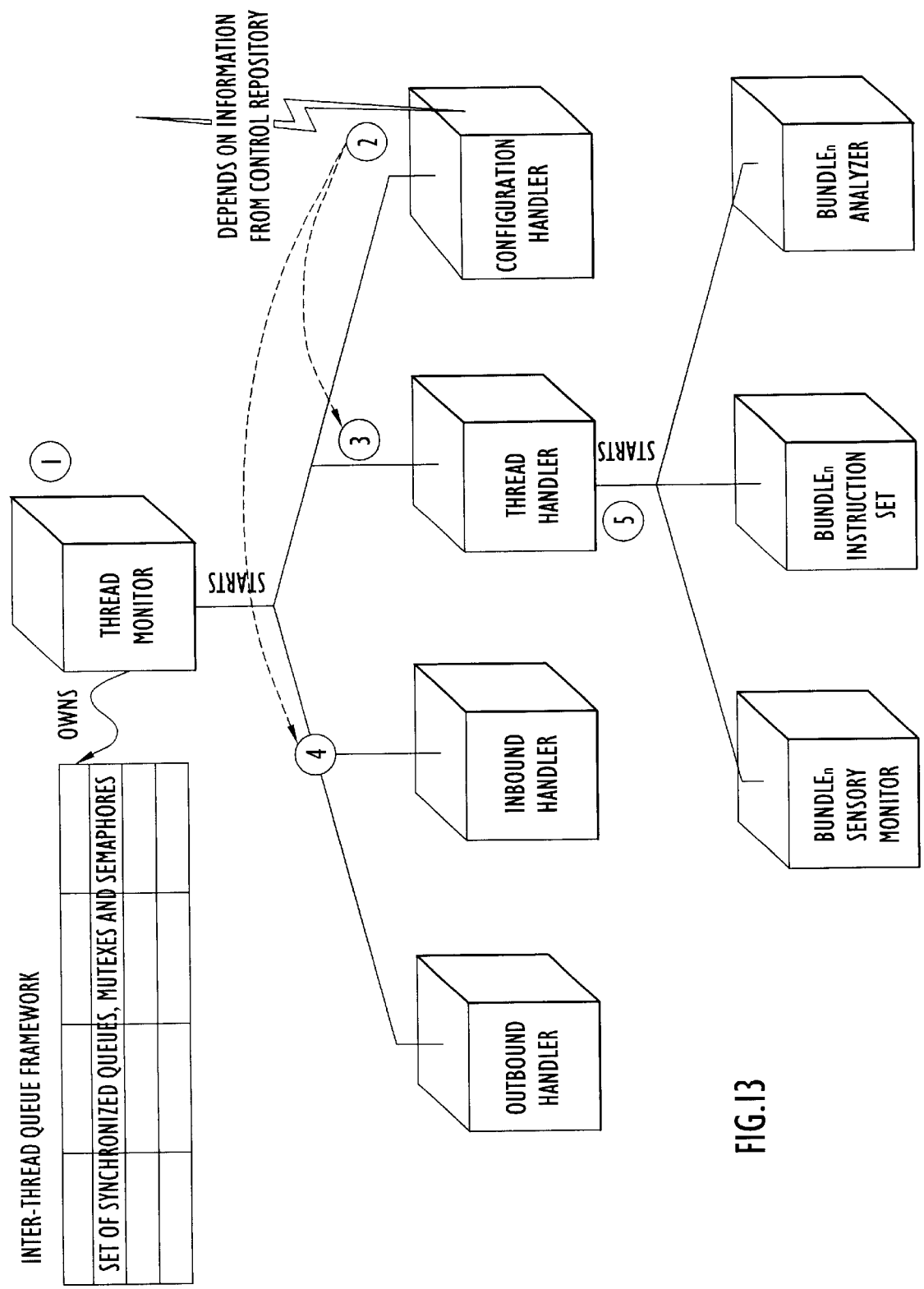
FIG. 13 shows the flow of control in an agent manager.

A schematic illustration of making an Agent Manager and dynamic agents data driven, is provided in FIG. 12, and the flow of control in an Agent Manager is illustrated in FIG. 13.

Overview of Runtime

When the preferred embodiment of the invention is to be used to operate and manage an external computing system, it is sufficient to install and begin running: it is not necessary beforehand to customize the software either to the particular types of components in the external system, or to the number of instances or configuration of those components in the actual system, or how the various component interrelate. This is because the preferred embodiment is constructed in such a way that, once it begins running, it itself discovers the information that it needs concerning the external system.

Figure 14:
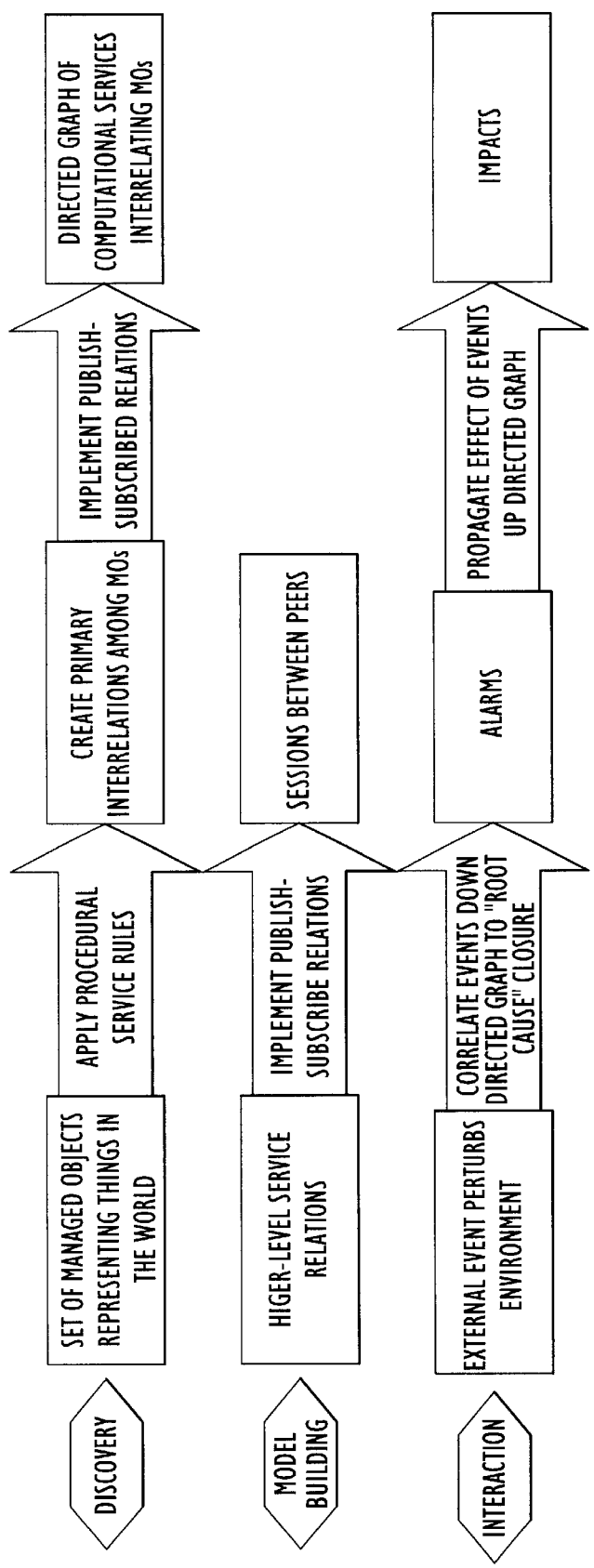
FIG. 14 shows three phases of the model architecture.

The runtime of the preferred embodiment includes several phases: the discovery phase, the model building phase, and the interaction phase (see FIG. 14). These phases overlap in time, and in a sense neither the discovery phase nor the model building phase ever terminates, but rather both continue throughout runtime, as changes are made to the external system's make-up or arrangement. Each of these will be discussed in detail in turn.

I. The Discovery Phase

When the preferred embodiment first begins to run, it has no knowledge of the particulars of its environment (i.e., the external system it is supposed to monitor). All its "knowledge" that will be used in learning what it needs to know about the particular external system, is initially to be found in the Control Repository. This Repository contains a lexicon of kinds of modeled MO, and hence an inventory of the hardware and software components that, initially, the runtime model of the preferred embodiment can recognize. The system administrator can manually supply the information needed to instantiate MO's for elements or parts of the external system that are not accounted for by the initial contents of the Control Repository.

The model's first steps are to recognize and represent the world in which it operates (the external system). This will include finding the set of devices and applications and other software that populate the external system, recognizing the members of that set as instances of items in the inventory (where possible), instantiating objects of the appropriate type within the model, and labeling those objects (MO's) with names that reflect their name in the external system.

Once armed with this information, the model establishes a directed graph in which the MO's form the nodes (it will be understood that this graph is of the model, not directly of the external system, and that the "nodes" here referred to are MO's, and are not the same "nodes" to which reference was made above in the portion of the Detailed Description titled "Nodes"). In the directed graph, the relationships between the MO's characterize and define the edges. Whenever possible, determination of the relationships between MO's comes about by applying the MOs' procedural knowledge of services they consume, services they provide, and systemic constraints on those services. For example, suppose that in the external system to be managed, IP services must be provided to consumers on the same computer node (this "node" is the concrete type of node referred to initially), and that one provider provides those services to many consumers. Given any IP service consumer application, the model can determine that that application must consume IP services from a single IP provider on the same computer node (i.e., the network protocol of that node). In general, it is possible to characterize MOs' procedural knowledge as their ability to determine their nearest connections based on the services they supply and consume.

To recognize managed resources in the external system as exemplars of models that exist in the Control Repository, there is required a logical "discovery" process that has two primary functions. The first is heuristic, to identify absolutely that the resource it has discovered is an instance of a known type. The second relates to configuration, and is to identify from the configuration information for the resource in question, the set of relationships it participates in (e.g., the MIB tables that reveal the interrelations among cards, ports and interfaces within a router). This information includes specific identifications of the other system components involved in these relationships.

The discovery process also needs to pass the information it has learned to the model, so that the model can create the required instances of MO's to correspond to the external system resources the discovery process has encountered. The process encapsulates its information into an attribute list that describes the resource in the terms required by the model. It passes that attribute list to the Factory component of the model server, which draws on the information stored in the Control Repository to determine the possible services a MO of this type can provide and consume. (An attribute list, as is well known, is a data structure comprising a variable list of labels followed by associated values.) It matches this information to the services it deduces this particular MO actually is providing or consuming (inferred from the attribute list received from the discovery process), thus determining the interrelationships between this MO and others, and so, effectively, situating the MO in the model properly.

Creation of an Inventory of Instances

From the model's perspective, there are two gross categories of resource or component in the external system: those that have adequate instrumentation to allow an external observer to discover them, and those that do not. Autodiscovery is used herein to refer to the process of gathering the inventory of system resources that have such instrumentation, such that a process can determine their existence and identify them properly. The discovery of system objects that lack such instrumentation is termed manual discovery.

Autodiscovery

During autodiscovery, the model interacts in an unmediated manner with the external system. For the sake of a simple example, this explanation will focus on the example of IP-based discovery because it is clear and well understood.

Figure 15:
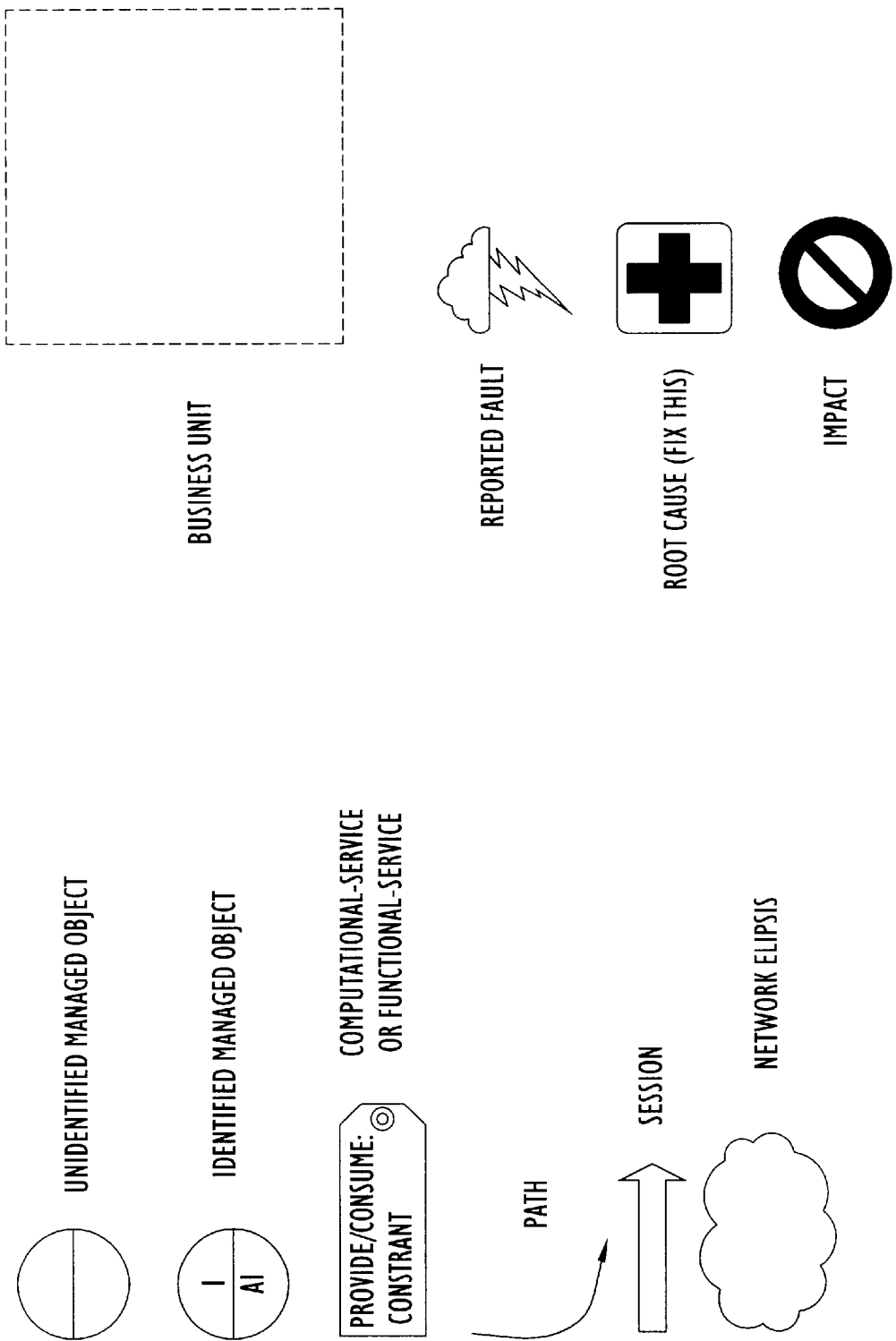
FIGS. 15, 16, 17, and 18 illustrate the discovery process during runtime.

A number of figures are referred to in this explanation, and represent the same graph of a small segment of an external system under management by the invention, seen at different phases of operation. FIG. 15 contains a legend to explain the symbols used in this explanation. As shown in that Figure, a disk with an X across is an unidentified MO. A disk with a horizontal bar across it represents an identified MO (such disks are labeled to distinguish them from each other, the letters used for that purpose in this example including A for application, C for computer, D for database, H for hub and R for router; it will of course be understood that the preferred embodiment is not limited to managing resources of these or any other specific types). A solid arrow is used to designate a path, while a hollow arrow denotes a session. A rectangle encloses and denotes a business unit. A tag denotes a service (computational-service or functional-service), a cloud outline a portion of the network that is not included in the illustration, and a cloud with lightning a reported fault. A square with rounded corners and a cross on it indicates a root cause, and a disk with a diagonal bar across it, an impact.

In autodiscovery, the criteria for inclusion of MO's in the model might, for example, comprise a set of starting network addresses for the discovery process, together with the constraints on the range of acceptable addresses that effectively limit the possible inventory to addresses that fall within that range. These limits are preferably set by the system administrator at the time of installation, and so permit the administrator to limit the breadth of the discovery process (for instance, it may be decided to limit the initial discovery to only a particular subsystem of the overall external system). Such breadth constraints thus define which IP networks are to be discovered, and which IP subnets in those networks are to be ignored.

The preferred embodiment itself sets the limits on the depth to which discovery is conducted (that is, the information actually needed is gathered, but information beyond that is not sought). Such depth constraints include the need to discover all subnets within the defined breadth constraints, all IP routing devices within the breadth constraints, the physical make-up of the IP subnets, all IP devices within those discovered subnets, all media access control methods ("MAC") of those IP devices, all repeating devices (hubs) among those IP devices, the physical connections between hubs and other IP devices, all bridging devices among those IP devices, and the physical connections between the bridging devices and other IP devices.

After performing such an IP discovery, the model will know all IP subnets that meet the administrator's breadth criteria, and within those criteria all IP devices and their capabilities. From that information, the model will then be able to create IP network maps that show how the IP subnets are joined together, create IP subnet maps that show how IP devices are physically connected together, and know what devices to monitor for health and performance. (It is to be emphasized, however, that in the preferred embodiment, the model will not actually include all this information, although the information will be used to construct the model. If the model later needs some of this information, what is required will again be gathered from the external system by means of dynamic agents. That is, once the model is constructed, only a subset of the available data, and only a subset of the originally discovered data, is included in the model. The knowledge base for the model is the external system itself, and not a separate database, or the model itself.)

The autodiscovery process includes three phases: protozoan discovery, generic discovery, and personality discovery. The protozoan phase involves identification of discoverable nodes (this refers of course to "nodes" in the more concrete sense first used above, not to the nodes in the graph formed by the program, as the latter only come to be defined as the former are discovered); the generic, the association of discovered nodes with standard types (e.g., a MIS defined by a network working group's RFC); and the personality phase, which in the preferred embodiment is the association of discovered standard types with manufacturer-specific types (i.e., proprietary MIB extensions). These multiple phases are used because given discovery procedures are able to identify only limited amounts of information. The preferred embodiment incorporates preexisting procedures, but is believed to be unique in the way it combines and drives those procedures. Heterogeneous procedures that were evolved independently of each other, without any unifying design concept or strategy to ensure their ability to co-exist and cooperate, do not necessarily flow easily from one into another. Splitting the autodiscovery into phases recognizes this circumstance, and also provides a method for optimizing the flow of control among the various procedures that are utilized.

Figure 16:
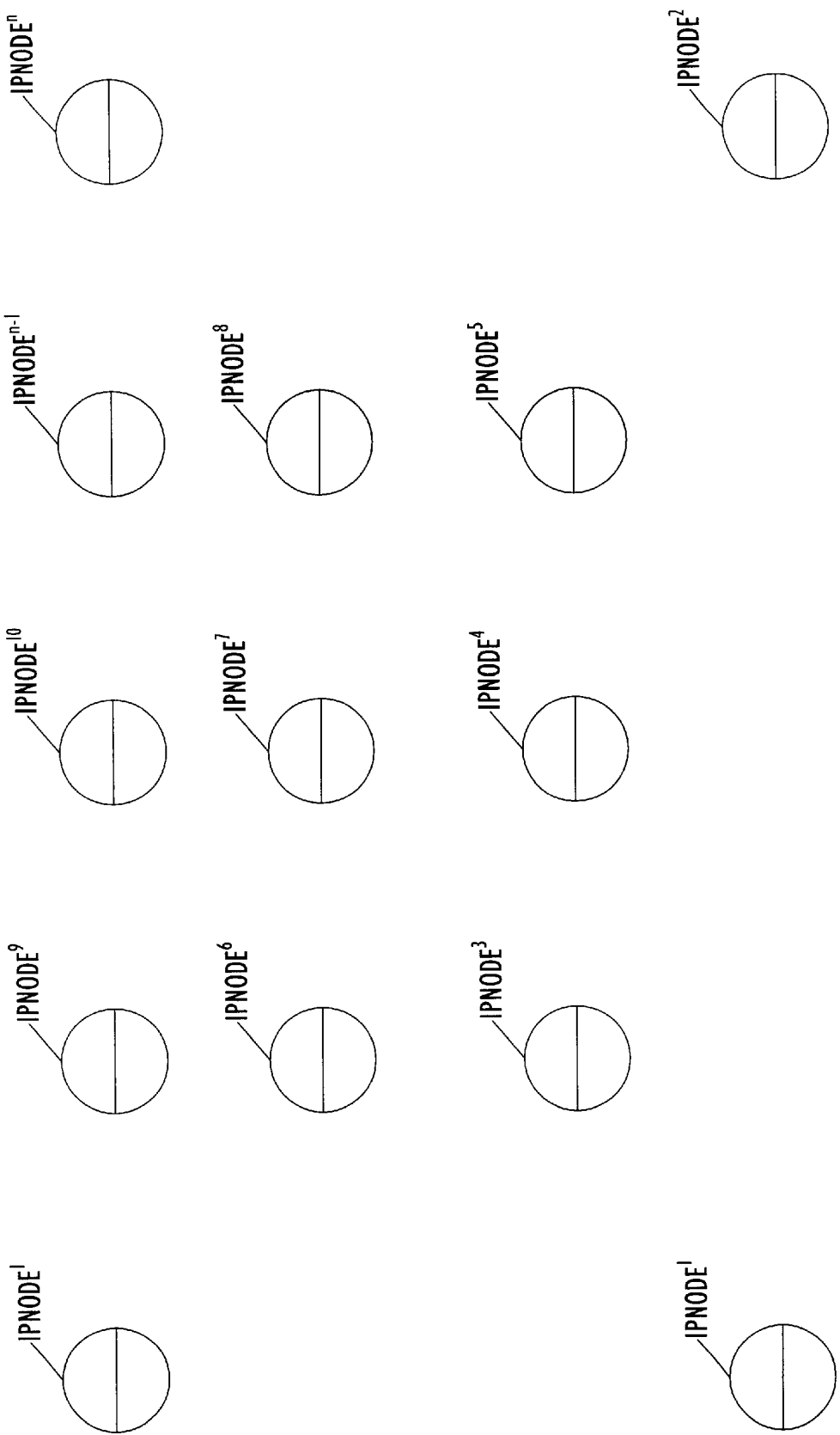

In protozoan autodiscovery (see FIG. 16), the process emits Internet Control Management Protocol ("ICMP") ping signals to all possible addresses within its breadth constraints on the networks it is responsible for discovering. A response to an ICMP ping indicates only that an object exists on the network, however, and does not indicate its type or identity. By recording all addresses that respond, the process effectively creates an inventory of all IP addresses that might label discoverable devices. FIG. 16 depicts nodes that have responded to the discovery processes's ICMP ping requests. That Figure represents those nodes as disks, without any other information, to reflect that the model has insufficient information as yet to determine what kinds of system resources or components they are.

Figure 17:
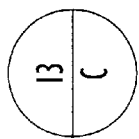
Figure 17:
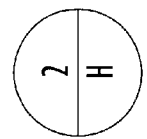
Figure 17:
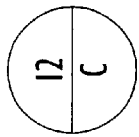
Figure 17:
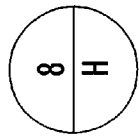
Figure 17:
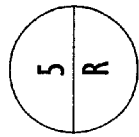
Figure 17:
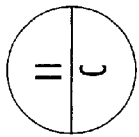
Figure 17:
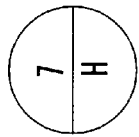
Figure 17:
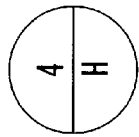
Figure 17:
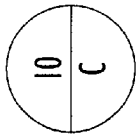
Figure 17:
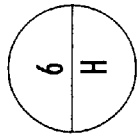
Figure 17:
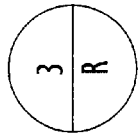
Figure 17:
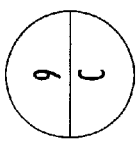
Figure 17:
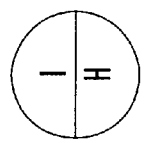

The aim of the generic phase of autodiscovery is to learn what kinds of standard devices—routers, repeaters, bridges, hubs, computers, etc.—are present in the external system. At the end of this phase, the process will still not know manufacturer-specific extensions to the standard device types. FIG. 17 illustrates the result of this phase. The process has successfully discovered computers (C-nodes), hubs (H-nodes) and routers (R-nodes) in the external system in question. The discovery process issues SNMP ping requests to the items it has located in the protozoan phase. A positive response to an SNMP ping indicates that the device is SNMP-compliant. Once the discovery process knows that a given device responds to SNMP requests, further SNMP queries against the device's MIB tables reveal what kind of device it is.

The discovery process also extracts heuristic information from the Control Repository that allows it to identify any standard MIB positively. The value of either the Enterprise Object Identifier ("EOID") MIB variable or some concatenation of MIB variables provides a generic device type's necessary and sufficient recognition criteria. Configuration information from the Model Repository allows the process to extract configuration information once the device is positively identified. This information will include information about the resource's ability to recognize and report problems it may experience, to the extent that such ability is standard in devices of the general type in question.

Upon completion of the generic phase, the discovery process has identified the resources in the pertinent portions of the external system down to the level of manufacturer's make and model number (where appropriate). If the MIB's of all of a manufacturer's models are identical as far as their participation in the fault and performance operations is concerned, differing only in variables concerned with device configuration or the like, there is no reason to differentiate among them.

The personality phase uses the same procedures as the generic phase. The difference is that this phase extends the process beyond standard MIB's to the manufacturer's MIB extensions. These extensions offer additional information about the device's own internal configuration and any errors it may recognize and report beyond the standard. The Control Repository houses heuristic identifiers and configuration material associated with "personalities" (the individual characteristics of a particular model or the like) in the same manner as with generic material.

Once the dynamic agent has gathered this information, it instantiates a software object that contains the information of interest. The class of object instantiated corresponds, in the preferred embodiment, to the generic type of component or sub-component, and the personality information is represented as an attribute of that object. That is, the preferred embodiment avoids the conventional means of extending existing categories (the generic classes), i.e., using object inheritance hierarchies. The inheritance mechanism, as is well known, allows objects to share attributes and methods based on their structural relationship. The disadvantage of that technique for the purposes of the present invention, is that inheritance relationships are intrinsically compiled, even in an interpretive language like SmallTalk. Adding a new class of object within an existing class would require a recompilation. The approach taken in the preferred embodiment avoids the need to recompile, and thus permits the invention to continue running without interruption.

Figure 18:
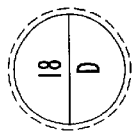
Figure 18:
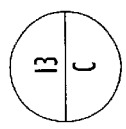
Figure 18:
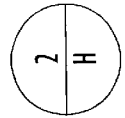
Figure 18:
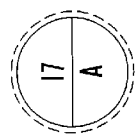
Figure 18:
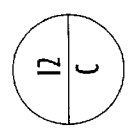
Figure 18:
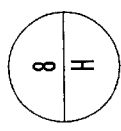
Figure 18:
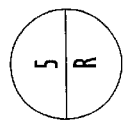
Figure 18:
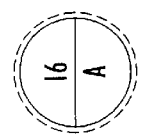
Figure 18:
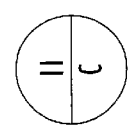
Figure 18:
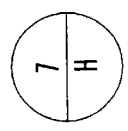
Figure 18:
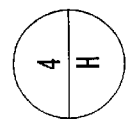
Figure 18:
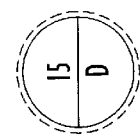
Figure 18:
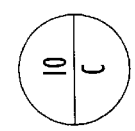
Figure 18:
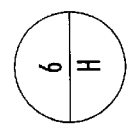
Figure 18:
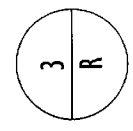
Figure 18:
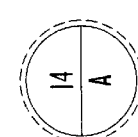
Figure 18:
Figure 18:
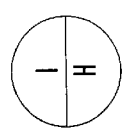

As an example of the discovery process, IP discovery is illustrated in FIG. 18. This is typically handled by a single software agent, which does "boxes and wires" discovery ("BWD"), after which other agents fill in system-level information such as applications and databases. If desired, a given site can break the BWD agent into multiple agents each responsible for a subset of the enterprise. (It should be noted that while the process is illustrated as a sequence of steps, in practice, the entire discovery process is preferably executed in parallel, which permits a dynamic agent to pass off control to another dynamic agent that can pursue alternate discovery paths.)

The process begins with the receipt from the system administrator of a list of networks, subnets, subnet ranges, and hosts or host ranges. In this step, every subnet or host is passed in with a subnet mask. A list of subnets to discover is then built; this may include a predefined list of hosts. For each subnet, a broadcast ping is emitted, to see if anything answers. Based on the response, a list of all possible addresses on the subnet is made, and those addresses are pinged. Then, an initial SNMP query is done. (All SNMP-compliant devices are handled before any non-compliant devices, to save time.)

The initial SNMP query requests how many interfaces the queried node has, whether it has its routing flag turned on, and what system services it supports. As it is possible that a device that does not support a service may nonetheless report that it does support that service, the query also includes the system name, confirmation that the node's apparent address is actually in the node's address table, and if so, the node's subnet mask.

Each SNMP node has its entire address table walked, and any nodes having multiple addresses (mostly routers) are queried for their address resolution protocol ("ARP") tables. (This table is important because it is the only means by which one can hook a computer up to its LAN access port, usually a hub port, as the hubs only know about MAC addresses.)

One point to be observed is that while a router (for example) may have more than one active IP Address, it is not desired to create multiple nodes in the model, and neither is it desirable to query the router for the same information repeatedly. The ARP information is used to avoid both of these pitfalls.

All SNMP nodes are queried for interfaces, ifStack, etc. The process then builds the SNMP nodes; that is, the process instantiates software objects representing the respective nodes. These objects are not part of the model, but will eventually be used to forward the necessary information to the model for the latter to create a corresponding MO. Any repeater boards or ports are built, and MAC addresses are retrieved. Vendor specific discovery is performed, and finally, factory orders (that is, objects containing the information needed by the Factory component to create a corresponding MO), are sent to the model for that purpose. Once all SNMP nodes have been processed in this way, non-SNMP nodes are processed, after ARP tables for their subnet have been retrieved. Once the entire subnet has been completed, connections are made between hub and computers.

Preferably, the threads of the agent correspond to respective ones of the boxes shown in FIG. 18. The ping thread receives Subnet objects in its queue and generates IPAdress objects via its pinging. These latter objects pass through the other queues.

Manual Discovery

Not all resources in an external system, in general, will have instrumentation sufficient to participate in the discovery process described above. In some cases, this may be simply because the resources of interest include ones that the system itself does not recognize, such as a subdivision of the business enterprise. For example, the "New York Accounting Department" is not meaningful to the distributed computing system itself, although it does represent the way people in the enterprise think of a particular group of applications and devices. In other cases, devices or applications simply may not observe instrumentation standards. In the preferred embodiment, manual intervention is used to add MO's corresponding to both types of resources to the model. Administrative functions at a user station allow the system administrator to add such MO's by hand. The addition of such MO's (including applications (A-nodes) and databases (D-nodes)) is illustrated in FIG. 18.

Once the necessary information regarding the discovered component has been put into the proper format, it is passed through the Agent Manager cascade to the model server. The Dispatcher delivers it to the Factory component, which instantiates a corresponding MO.

II. Model Building—Constructing Interrelationships

The next phase of building the model is constructing the mesh of actual service interrelationships among MO's.

One important aspect of the invention is premised on the idea that these interrelationships are a key way of characterizing the system, and that the understanding of the way that faults and performance degradations flow through the system must depend on these interrelationships.

The model introduces the concept of service to describe relationships between MO's. All MO's participate in the network by consuming or providing services (or both). A singleton or isolate (an MO having no relationship to any other MO), by definition, cannot be part of the network. The concept of services is used to constrain the relations between MO's. By restricting the number of possible services, the system forces "services" as represented in the model to be abstract because they necessarily have to ignore subtler distinctions. More importantly, perhaps, services inherently impose constraints through cardinality co-occurrence restrictions. For instance, an application needing IP services is constrained to find IP services on the same copy of the operating system that it is running on. The IP MO provides IP services to all requesters running on that OS; therefore, IP services must support a one-to-many cardinality.

The purpose of services in the preferred embodiment of the invention is to provide MO's with the ability to determine what other MO's they connect to, in as many cases as possible. If an application needs IP service, for example, its MO will construct a relation to its network protocol MO. If an operating system needs domain name services ("DNS") within its subnet, its MO will construct a relation to the MO corresponding to its local DNS service provider. If multiple services differentiate themselves only by tolerance, the MO representing the element that needs the service will form a relation with the MO of the provider whose service tolerances best meet the service-consumer MO's requirements.

Figure 19:
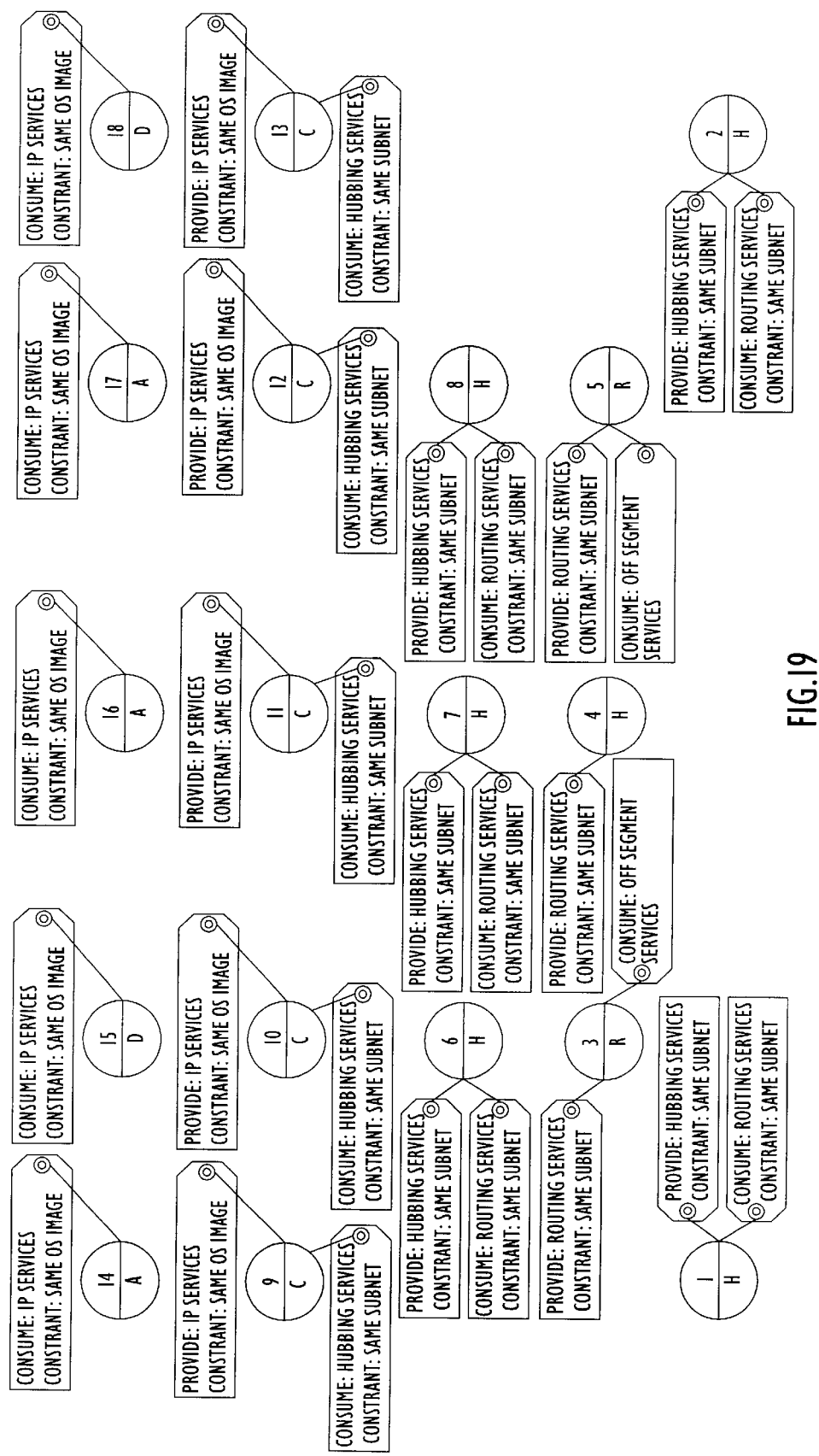
FIG. 19 illustrates some of the computational services that the discovered managed objects provide and consume.
Figure 20:
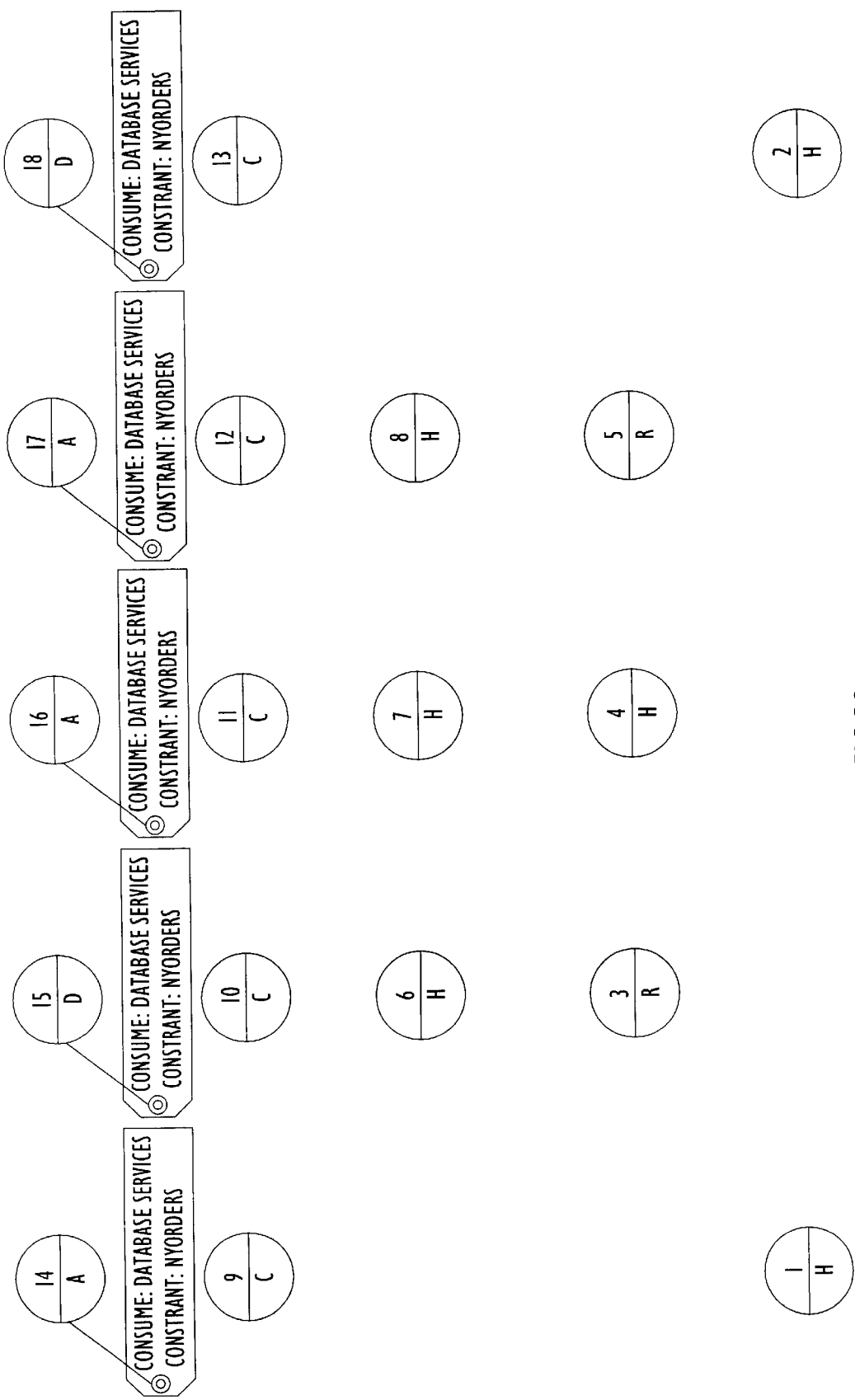
FIG. 20 illustrates some higher-level services that discovered managed objects in FIG. 19 provide in response to the organizational use of the computational systems.

FIG. 19 illustrates some of the computational services that the discovered MO's of FIG. 19 provide and consume. In contrast, FIG. 20 illustrates some of the higher-level services that the discovered MO's provide in response to the organizational use of the computational systems.

As discussed above, the model becomes a set of MO's that know how to resolve their connection needs, maintain dictionary memory structures of those MO's that are at a given time providing essential services for them, and consuming essential services from them. If all such service relationships were realized and displayed simultaneously, the result would be a snapshot of the internetworked MO's at that moment, i.e., a map of the paths of the network. The network of the model, that is, is an emergent property of MO's and services, and is not itself the ultimate focus of the model as the model is used in the preferred embodiment.

Figure 21:
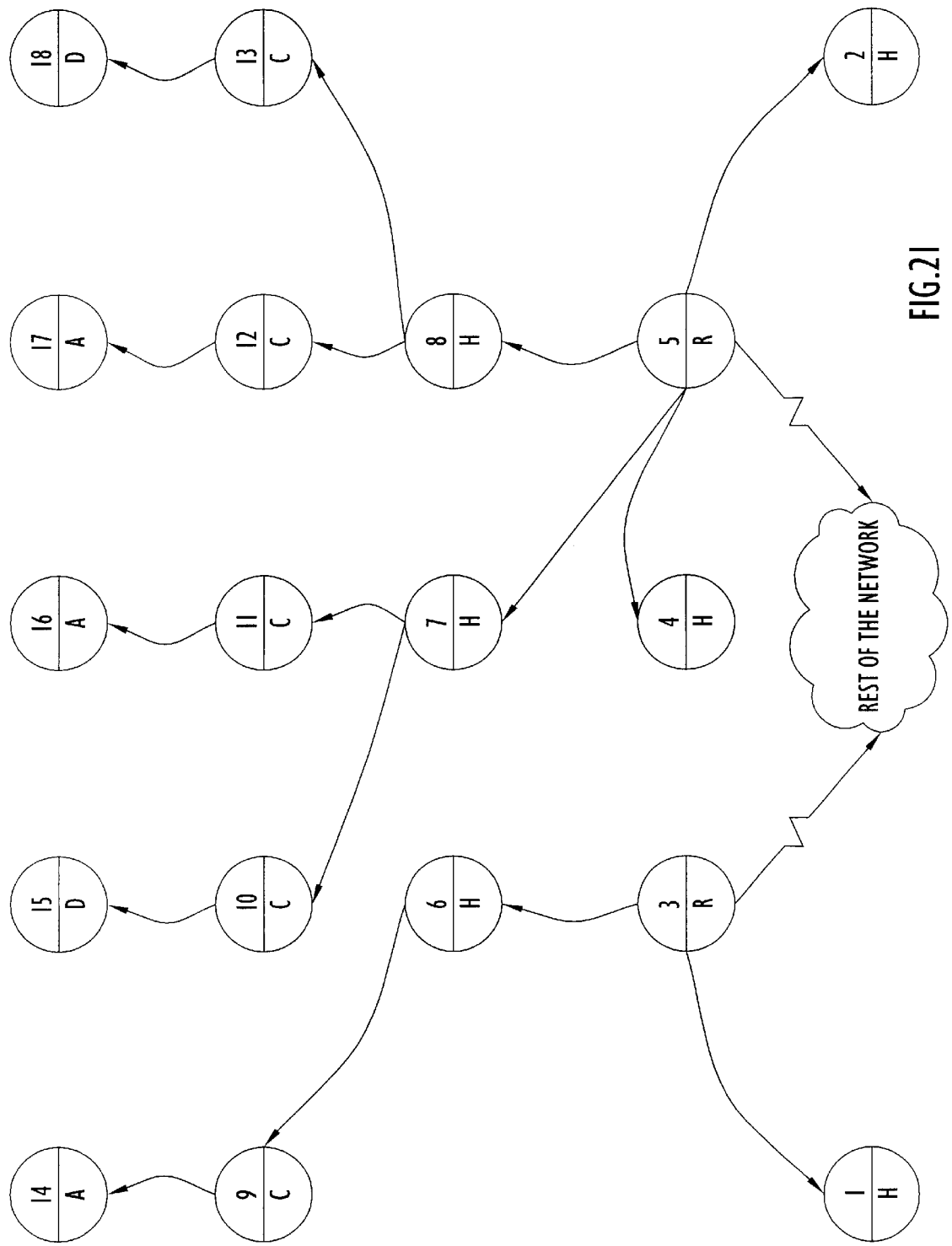
FIG. 21 represents the world of the model in terms of a network that has emerged from realized computational services or paths.

FIG. 21 represents the world of the model in terms of a network that has emerged from realized computational services or paths. Although this view is both volatile, and lacking in the richness afforded by services in general, it is visually simpler and so has greater graphical explanatory power.

Figure 22:
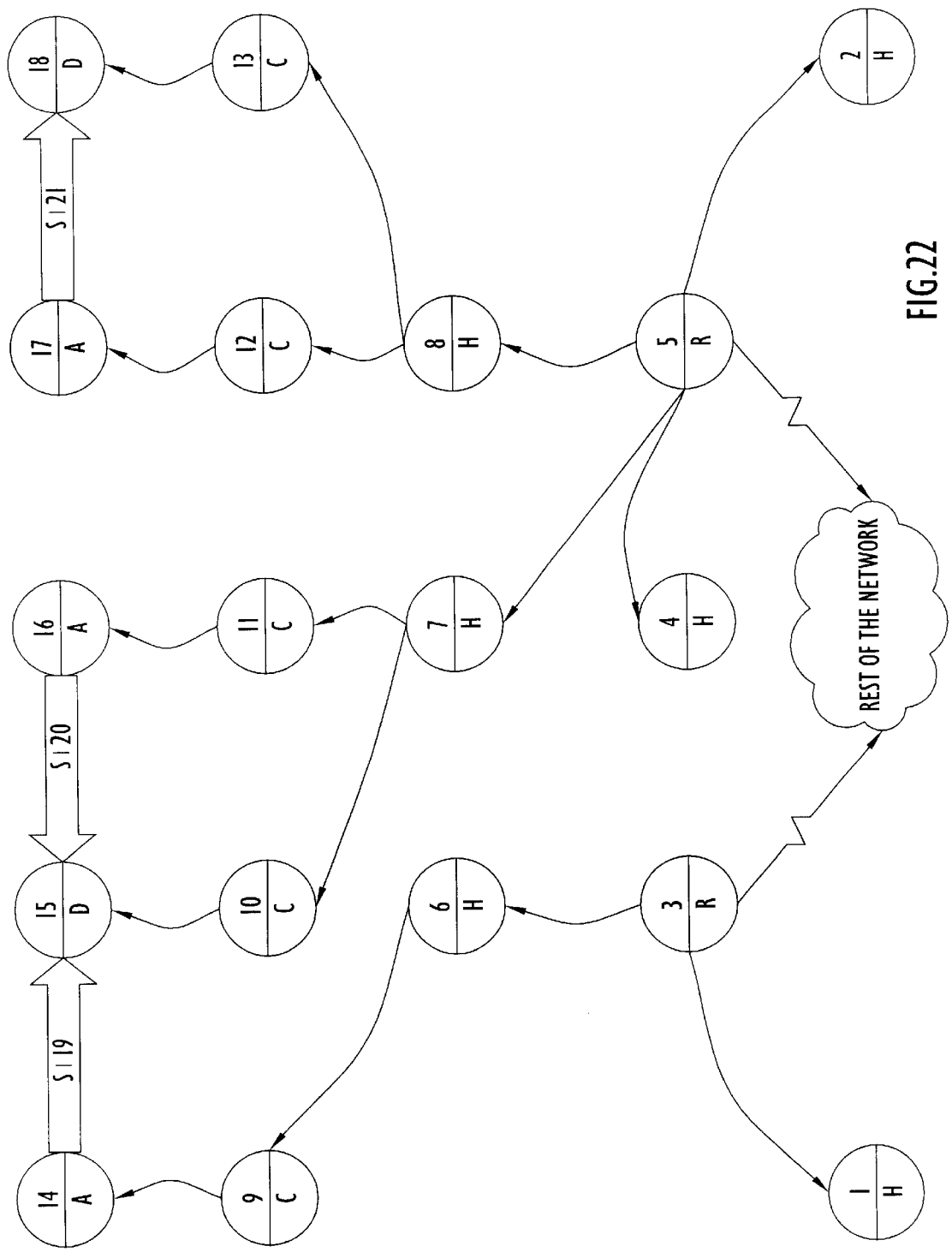
FIG. 22 illustrates the model including, in addition to paths, sessions.

FIG. 22 illustrates a more complete view of the world of the model than does the previous Fig. Here, in addition to paths, we see sessions, the network of MO's that emerges owing to patterns of organizational use of the services those MO's provide. Ultimately, it is necessary for computational services to realize sessions. The organizational-use model and the computational model are not transitive, however. The model is able to constrain possible paths over which a session may be realized, but cannot deduce—or explain— the necessity of a given session based on the computational model. This becomes particularly apparent when viewing a session between say, an application and a database from the user's perspective. While the session may be constant (meaning only that "this" application always interacts with "this" database), from the perspective of the computational model the path may change considerably—and invisibly to the organizational-use model. In other words, it is not always possible to infer the organizational-use model from the computational model.

The organizational-use model describes relations among MO's that are motivated by people wanting to accomplish some purpose through use of the distributed computing ensemble. This model is a grouping mechanism that informs the viewer of the preferred embodiment of the invention that particular MO's are related, but does not explain why. For instance, if user $U_n$ is a VP of marketing, she may need a number of networked automation resources available to her at all times to perform her job effectively. Business unit $BU_m$ is, say, the Comptroller's department. That department's job function also calls for a number of networked automation resources to be available at all times. In other words, for the purposes of the world that this embodiment represents, users and groups of users are containers of networked resources. These resources can be computers, application, telephone extensions, printers, and so forth. For graphical purposes, a depiction such as that in Fig. (Diagram 23) represents these groupings of needed resources as containers whose elements match users' basic level of categorization of resources. In other words, if business users "see" their resources as computers and applications running on them, not all the behind-the-scenes devices, services and middleware that proper functioning of those resources depends on, then that is their effective grouping. Because the model contains the fully elaborated microscopic level of "behind-the-scenes" resources and their service relations, the end user's view does not preclude detail, it simply removes it from the center of focus.

Figure 23:
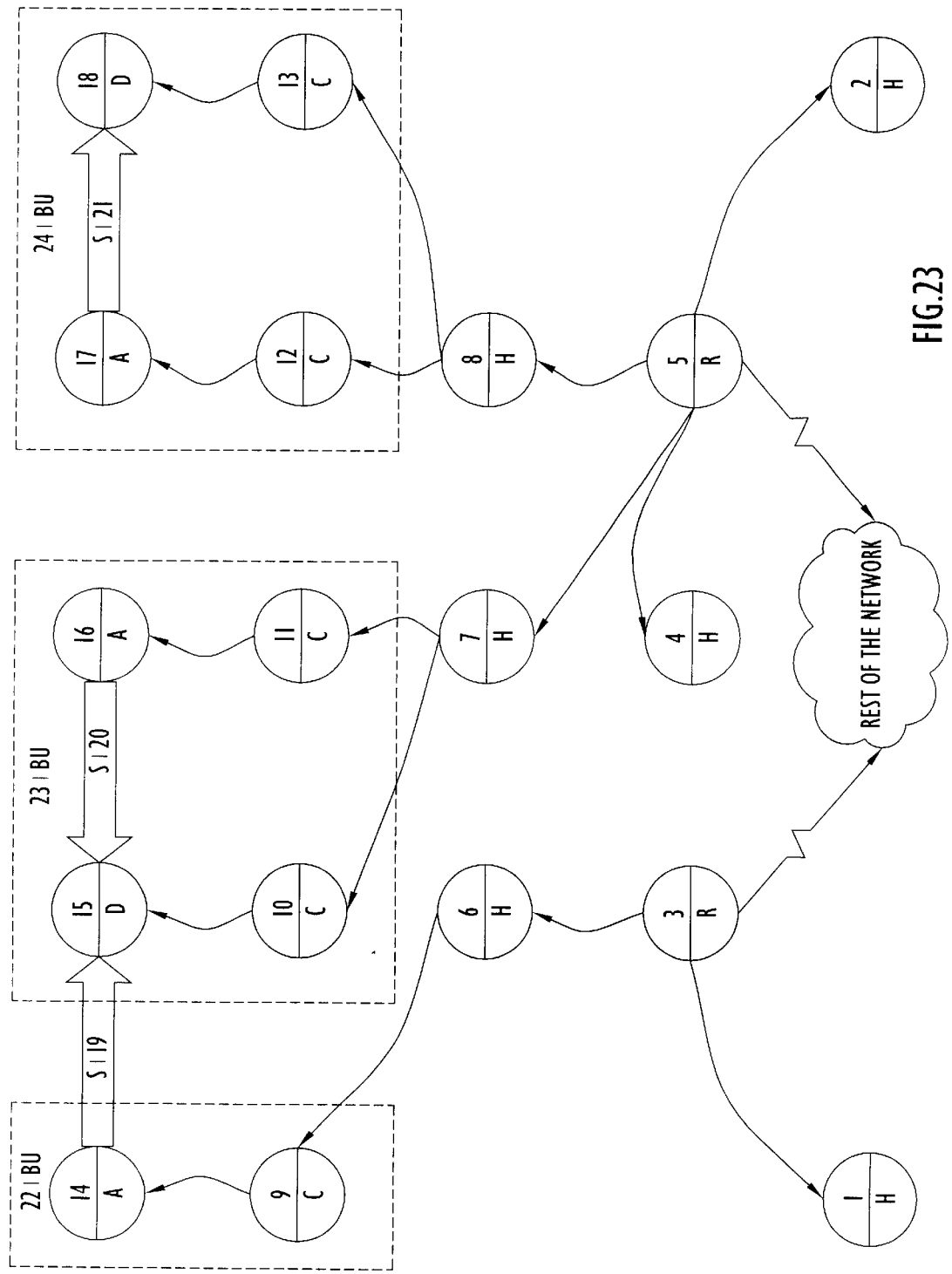
FIG. 23 represents groupings of needed resources as containers whose elements match users' basic level of categorization of resources.
Figure 24:
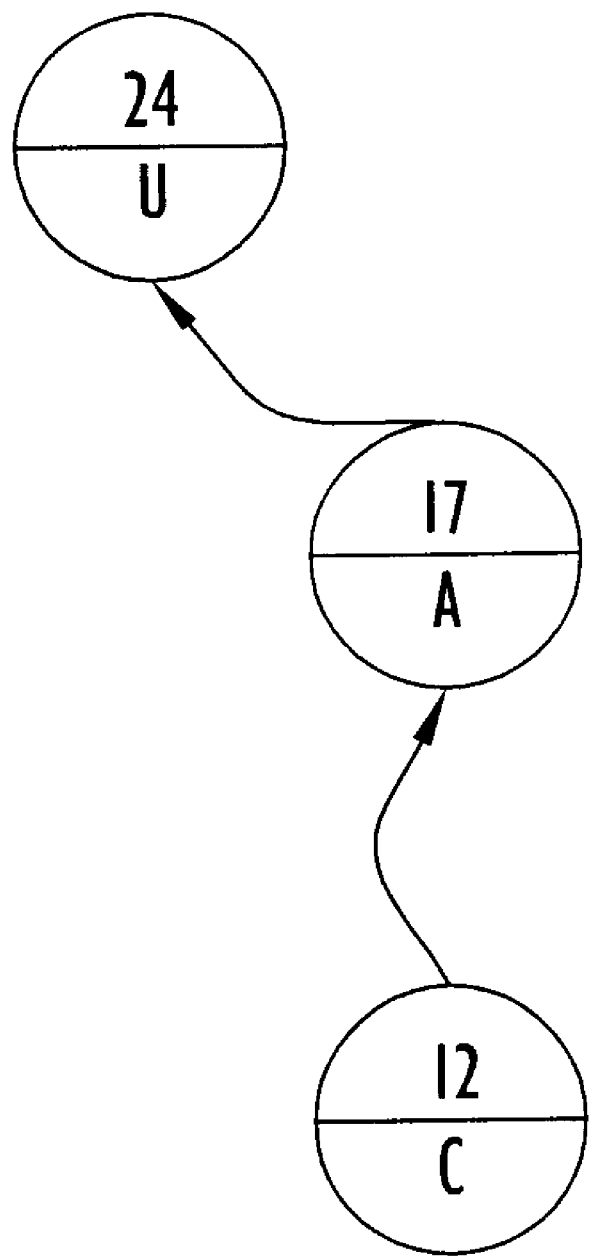
FIG. 24 depicts an alternative way to view these relationships.

It should be noted that while FIG. 23 may be an effective graphical representation of business unit or user containment, it is not the only notational variant that may be useful, and is not the only variant within the scope of the invention. FIG. 24 depicts a user U as a service consumer of application A in path notation; this notation makes clear that U suffers the impact of changes to A—as far as the model is concerned, there is no inherent difference between devices and end users for spread of impact.

In the preferred embodiment of the present invention, relations between MO's are classified as either simple or complex. A "session" in this embodiment comprises both path and service, as explained above. In a complex relationship, these two elements vary independently, while in a simple relationship, they vary in unison.

For example, networkaccess is a simple relationship in UNIX.

The network protocol is responsible for providing network access—i.e., networkAccess is a service of the network protocol. There is no particular path choice that the system can make; by virtue of running on the OS, the application potentially has the service. Physical connections between, say, a card and a backplane are also simple; in this case, however, the path is the focus. There is no particular service choice available. By virtue of being seated in the containing box, the card is connected to the backplane. The simple is Connected relationship here does not even specify that the system uses the given connection, let alone for what purpose. It records that there is a connection.

From the viewpoint of the preferred embodiment, paths are important for the reasoning engine to compute the impact of physical and lower-level logical failures on higher-level sessions. Services, on the other hand, categorize the kinds of relationships that make up the system at increasing levels of abstraction, and therefore provide a dimension of impact analysis from differing perspectives. For example, suppose one wants to know how reliable database service was for some set of business units. Categorization by service allows the model to cut simply across different database service providers and provide a meaningful aggregation of both fault and impact data for that service.

In the preferred embodiment, relationship types have the following attributes:

| ID | internal symbol |
|---|---|
| Name | human readable name |
| Cardinality | one-to-one, one-to-many, many-to-one, many-to-many |
| Dependency | parent, child, both, neither |
| Complex/Simple | complex (independently varying path and service) or simple (dependent variation of path & service) |

Relationship rules specify what entity types participate in what types of relationships. The preferred embodiment splits rules into producer (or parent) halves and consumer (or child) halves. This split provides a very flexible means of defining constraints on relationship participants, and allows the model to perform the discovery process described above, during runtime.

A relationship rule has the following attributes:

| ID | foreign key back to Service type |
|---|---|
| Parent/Child rule | <see example below> |
| Class | foreign key to the entity type |
| NextHopService Type | foreign key to a service type; used for path determination for instance networkAccess |
| Partner Restriction | foreign key to an entity type |

A given entity type inherits the relationship rules of its superclasses. It has the ability to add new rules that further constrain a more general rule, or even block the use of a rule defined by superclass types. For example, suppose that in a given client site, both IP and IPX provide networkAccess services. The preferred embodiment can express this capacity as a general network access rule for applications. Client application $application_A$ can use only IP, however. The definition for applications of the same type as $application_A$, then, needs to override a general G(child) network access rule that offers no restriction and provide a rule that restricts instances to IP.

Again, assume there is a predefined class Program, and that both NEWServer and REWClient are to be subclasses of Program. The model definer can also define a default value for the name attribute (such as "NEWClient" and "NEWServer"), as illustrated in the following tables:

| ID | NEWservice |
|---|---|
| Name | New Service |
| Cardinality | one-to-many |
| Dependency | child |
| Complex/Simple | complex |

(NEWService definition)

| ID | NEWService |
|---|---|
| Parent | NEWServer |
| NextHop | networkAccess |
| Partner Restriction | none |

(NEWService parent rule)

| ID | NEWService |
|---|---|
| Child | NEWClient |
| NextHop | networkAccess |
| Partner Restriction | none |

(NEWService child rule)

At this point, therefore, the invention has discovered what components populate the external system and constructed a model representing the service relationships that exist among those components. In particular, the system administrator has been able to define, in addition to the individual hardware and software components of the external system, higher-level groupings thereof, based on users' groups, business units or whatever other basis meets needs of the organization that owns the external system.

III. The Interaction Phase

As was stated above, two distinct kinds of events enter the model—systemic events (addition or deletion of MO's), and MO events (a change in the state or condition of a known MO). Both kinds of event are forms of interaction between the model and the external system. The function of the model at this point is to (1) correlate changes that affect disparate MO's back to root-cause events (in cases where the root-cause event is one that is identifiable as such); and (2) use the known patterns of interrelations among MO's to predict the impact of those changes. The event processing within the model will now be described.

Figure 25:
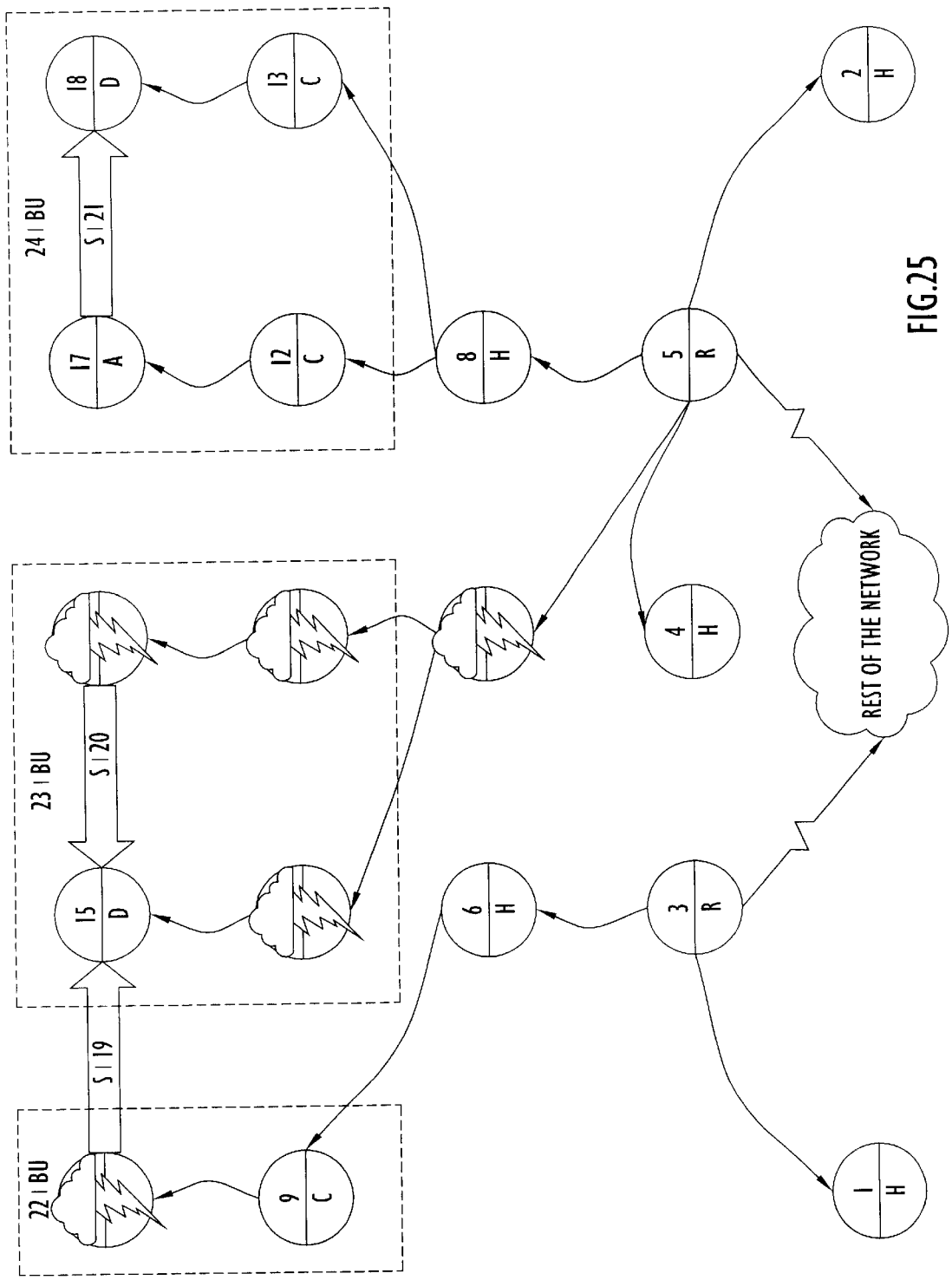
FIG. 25 illustrates the state of a portion of the model after dynamic agents have collected reported information from the resources.

FIG. 25 illustrates the state of a portion of the model after the dynamic agents have collected reported information from the resources represented by hub $H_7$, computers $C_{10}$ and $C_{11}$ and applications $A_{14}$ and $A_{16}$. The MO's in this portion of the model report that they have received state-changing events.

Figure 26:
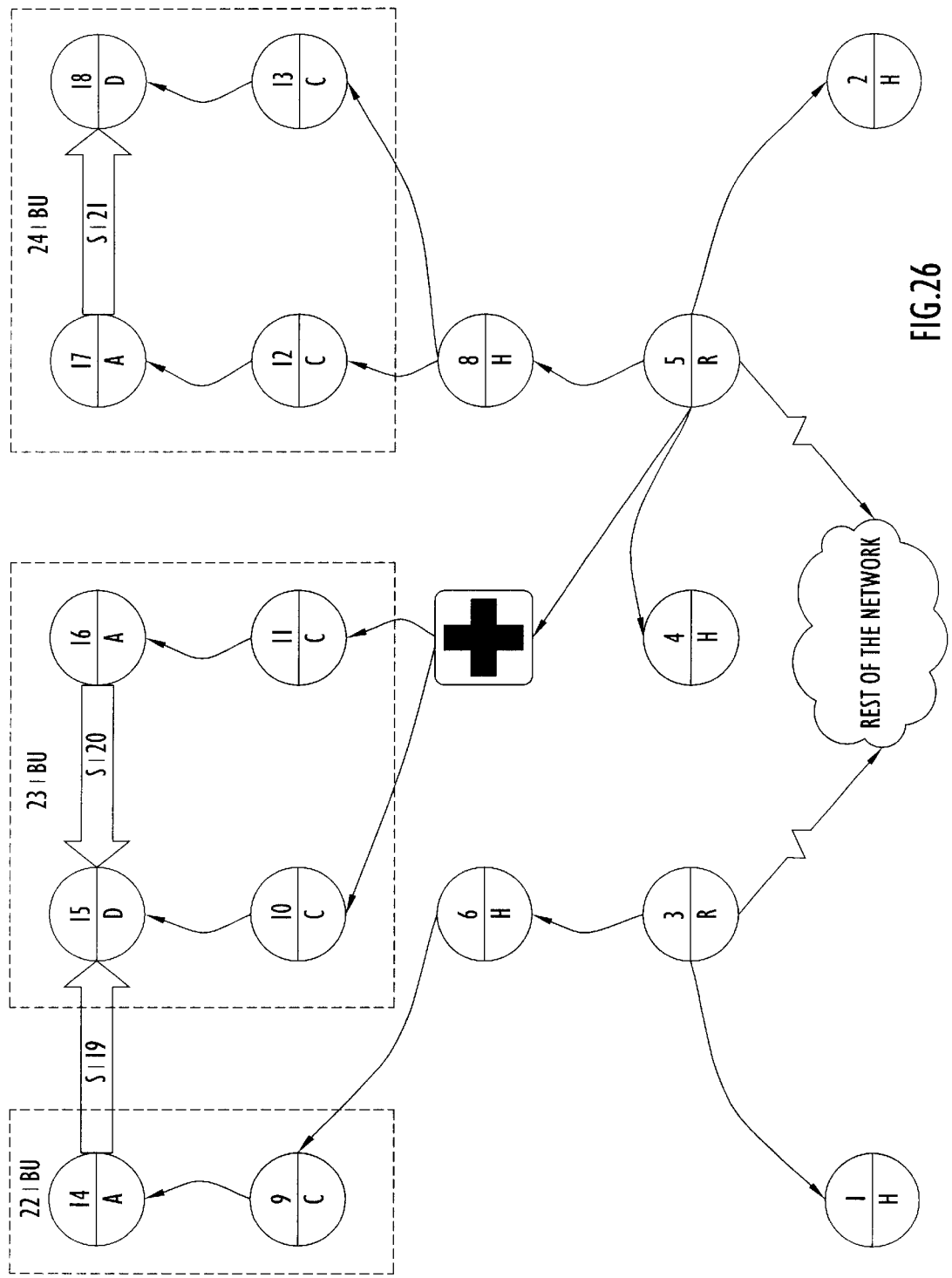
FIG. 26 illustrates the effects of the model's rootward graph traversal.

FIG. 26 illustrates the effects of the model's rootward graph traversal. The event at node $H_7$ indicated that it is a root cause. Therefore, rootward traversal through the model stops at $H_7$, and the model generates an alarm that focuses on $H_7$ but contains all the concomitant sympathetic events from the affected leaves. It should be noted that application $A_{14}$ may not appear in the Fig. to be directly leafward from the root-cause event at $H_7$, because of the direction of the arrow representing the session between that application and database D. In fact, however, the existence of that session means that that application is included in a leafward traversal from $H_7$.

Figure 27:
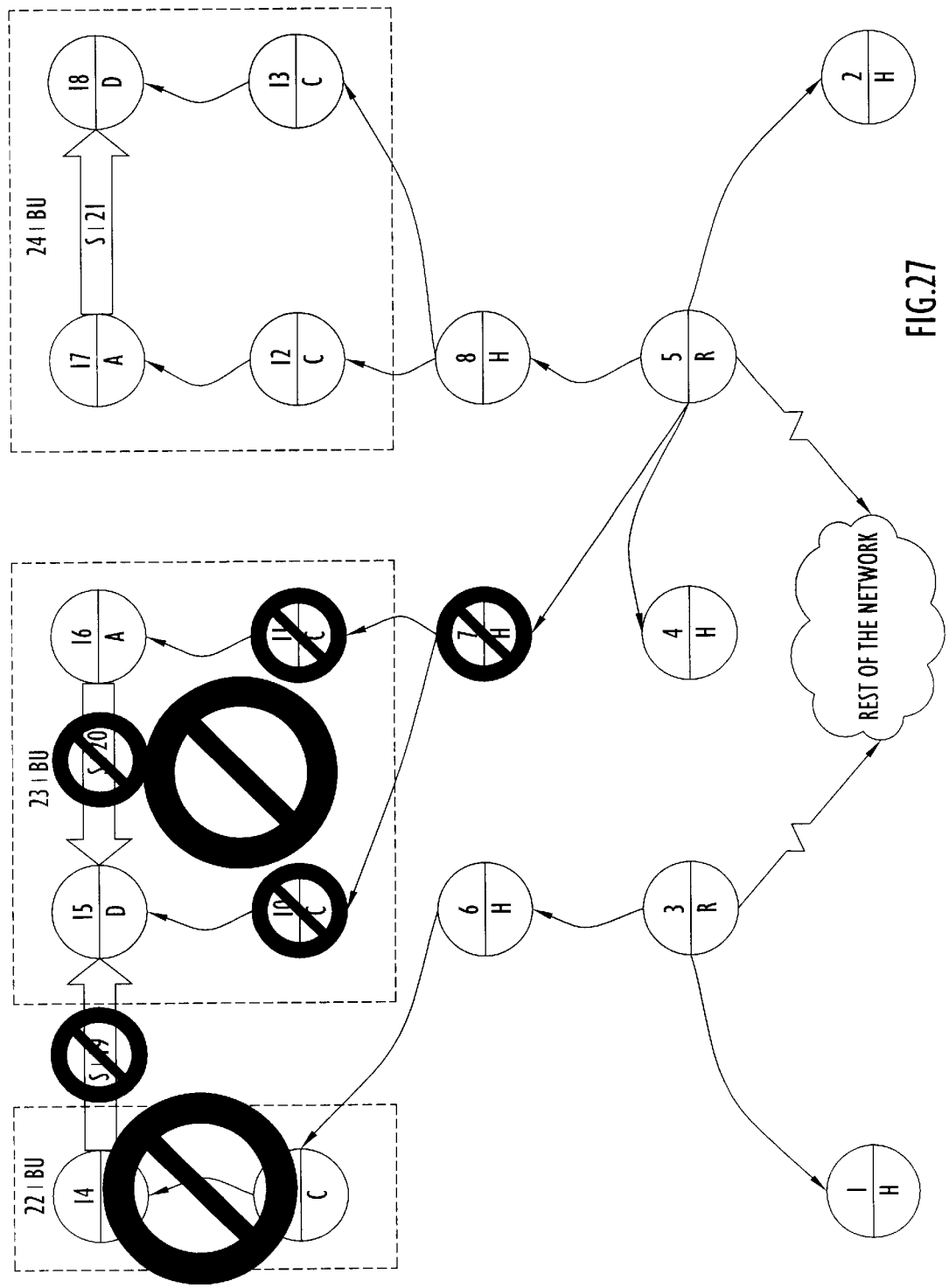
FIG. 27 illustrates the leafward spread of impacts through this portion of the model.
Figure 28:
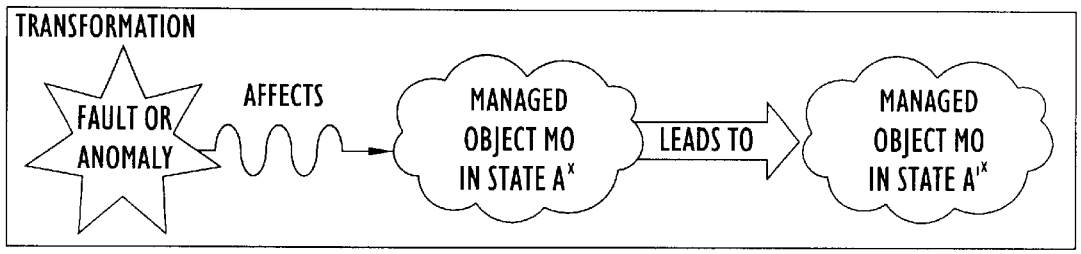
FIGS. 28, 29, 30, 31 and 32 schematically illustrate the interaction phase of runtime.
Figure 29:
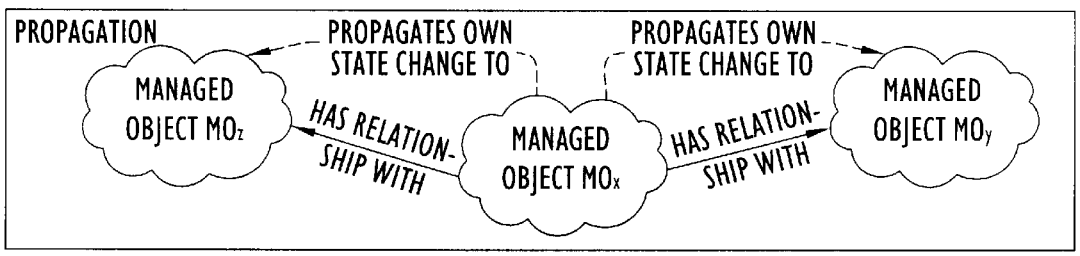
Figure 30:
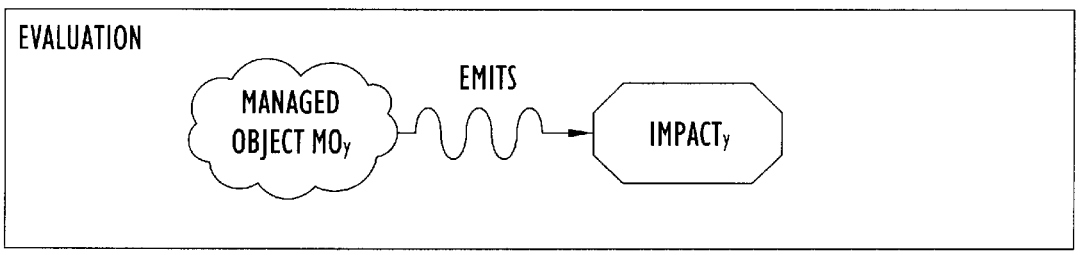
Figure 31:
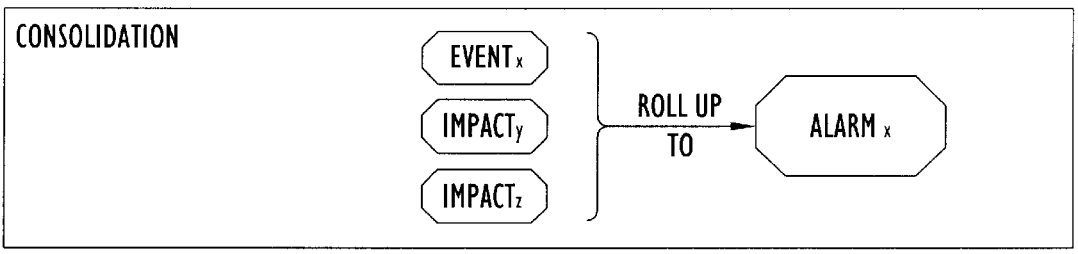
Figure 32:
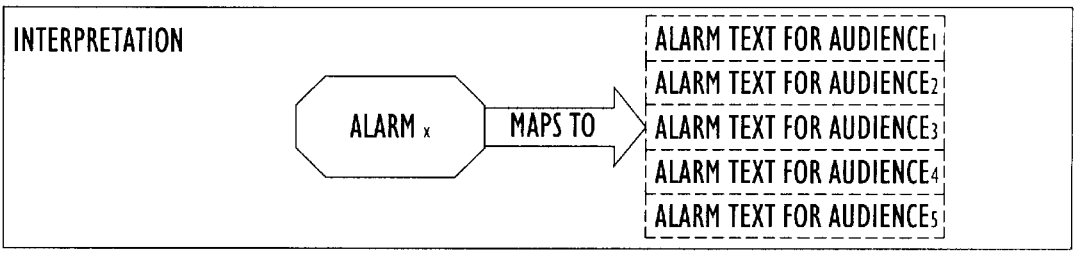

FIG. 27 illustrates the leafward spread of impacts through this portion of the model. The failure of the hub at $H_7$ has caused loss of service to computers $C_{10}$ and $C_{11}$, and to sessions $S_{19}$ and $S_{20}$ that connect to database $D_{15}$ running on computer $C_{10}$. The loss of these two sessions interrupts the work that people in business units $BU_{22}$ and $BU_{23}$ are doing. Thus the model has predicted the impact of a lower-level device failure on the activities of end users. These users are not resources that the system recognizes, nor resources that the system is able to collect data about (except through the intermediary of a trouble ticketing process). While the model's predictions for computers $C_{10}$ and $C_{11}$ may have corroborating evidence from the sympathetic events logged for those nodes, users and business units may well in a given instance have only predicted impacts at this time.

A schematic summary of the interaction phase is shown in FIGS. 28 through 32.

A more-detailed explanation of the functioning and structure of important elements of the system of the preferred embodiment will now be provided.

How to analyze events

The Analyzer function of the Agent Manager in the preferred embodiment is responsible for interpreting incoming data from whatever source, recognizing the data as an instance of some predefined event of interest to the system, and creating the association between the captured external event and the model event. Techniques of analyzing, interpreting and associating messages vary according to the data collection technique.

Structure of an event definition

Events in the model are instances of a pattern known as an "eventDefinition". EventDefinitions function as a kind of frame to hold information culled from a captured event.

In keeping with the data-driven nature of the invention, the inventory of eventDefinitions and their interpretation reside in the Control Repository. When new eventDefinitions and their interpretation arise (because of new MIB's, new devices or applications, a greater degree of granularity in event discrimination, etc.), the system administrator can update the Repository with the appropriate information and the model updates itself dynamically.

An example of the structure of an eventDefinition is as follows:

| | |
|---|---|
| resultantState | severity indicator |
| message Text | foreign key to a message dictionary based on language; each message has substitutable parameters defined that are filled in with values pulled out of actual events |
| eventId | a unique identifier for the event |
| isRootCause | true or false |

If the model captures information about an entity type via SNMP, it will have relationships to several SNMP objects in the repository: the SNMP enterprise OID; a table mapping trap numbers to eventDefinitions; and one or more MIB tables.

If the model captures information about an entity type via log file tailing, it will have relationships to several logging objects in the repository: the file(s) to tail; tables of pattern matches (inclusion criteria); parsing rules—what fields to extract from the message; and the eventDefinition.

Defining the state calculation of a model

While it is possible for system-defined MO's to have a single state, which they calculate based on the "resultantState" field of an event, the preferred architecture demands that states be properties of the viewer of a situation rather than of any component of the situation itself. Accordingly, it is preferred to replace a state value with a pointer to a tuple that has the dimensions viewer and formula. The Control Repository then contains all aspects of the association, allowing different sites to configure different classes of viewer and site-specific state-calculation formulae. Nonetheless, it is possible to envisage a version in which, at creation time, the user can define the state calculation for a user-defined grouping of MO's (i.e., logical groupings) as a predetermined formula that will provide minimum, maximum and average value calculations.

Dynamic agents in runtime

In the preferred embodiment, dynamic agents are semi-autonomous Java applications that are responsible for: interacting with OS-specific or protocol-specific sources; eliciting data according to a specific "recipe"; and analyzing the elicited data. As already discussed, each dynamic agent comprises three functional (although not necessarily structural) components: a Sensory Monitor, an Instruction Set, and an Analyzer. The sensory monitors interact with system- or high-level protocols—for instance, TCP/IP sockets, OS file systems, CMIP or SNMP. Instruction sets belong to the process of eliciting data.

They are control parameters and methods that direct sensory monitors in how to connect to a particular host, to delay three minutes between polls, etc. Analyzers belong to the process of analyzing data. They interpret and winnow information coming in from the dynamic agents (for instance, "take all messages that begin with [amd];" etc.).

The dynamic agents run according to a thread-based active object model, comprising at least one independent thread constantly running in an endless main loop. External system events interrupt the main loop; message-appropriate callbacks run on interrupt. New control information thus interrupts dynamic agents and alters their states on the fly.

The Agent Manager hosts the independent threads, and provides system and housekeeping services including: ensuring that all threads that should be running, are running; knowing where to send the data collected by the dynamic agents; handling thread interruption, termination and monitoring; and offering inter-thread messaging, queuing and synchronization services. That is, the Agent Manager provides an execution context for the dynamic agents.

A combination of inheritance and interfaces fits the dynamic agent components into the execution context. Integration requires:

an understanding of Agent Manager synchronization mechanisms;

asynchronous queues and interrupts;

message passing behavior;

message structure;

mechanisms to pass messages to other services in the system of the invention and to receive messages from them;

self-scheduling within the Agent Manager; and return of information to the model server.

The foregoing, however, mainly serves to supply the model with stream data. Operational end users also need ad hoc data. For instance, a network operator might ask the system to tell her about the collision rates on a given hub for the next ten minutes, polling at 20 millisecond intervals. The Agent Manager architecture allows users to demand data in this fashion. The data-driven architecture services users' ad hoc requests through flexible, reusable Java modules. Each of these modules follows the interface definitions required for the services of the system of the invention, but needs minimal exposure to the mechanics of the execution context to get its services.

Extending stream data collection techniques to ad hoc requests requires being able to:

tell the system of the existence of a module;

find an Agent Manager to run it;

schedule the module's running;

get an Agent Manager to find the module;

let a user pass state-changing control information to the running module;

return collected data to the specific requester rather than the general pool or data; and deal with the module's having two masters—the end user and the local Agent Manager, each of which needs to control some aspects of the module's execution.

In the preferred embodiment, the last aspect is the key to the others. The Agent Manager needs to handle the scheduling of all modules running within it, and to ensure that they have all necessary resources. On the other hand, the implementation of the running module is a black box from the viewpoint of the Agent Manager. Only the requester (human or automated) knows what the module is for. The requester needs to retain addressability of the module and to receive the collected information. Two independent subsystems in the environment, therefore, need to control the module simultaneously.

These competing demands are mutually exclusive, however. One set concerns governing compliant participation in the dynamic agent manager context. These methods are predetermined in the design of the embodiment, and thus programmers can build them into the system itself. Object inheritance provides a mechanism for the module to use a parameter block object and its queue manipulation routines that the local context furnishes at instantiation time.

The implementation of the module reflects user interpretation and business needs, and so is not predictable at design time. It does not play a role within the bounds of the closed system, so its role cannot be structural as far as the execution context is concerned. The system provides a fixed path for passing control and information messages for the individual request by assigning arbitrary CORBA CosNaming service names for both directions of the conversation at the time of the request. Such assignment tells a user request to address requests through service name X and receive responses through service name Y. (The CosNaming service also serves to define the cascades of Agent Managers discussed previously.) The ad hoc module receives the complementary information: listen for interrupts on service name X and return information on service name Y. Implementation remains up to the individual request.

The user-written Java module is now situated in the infrastructure. The execution context must find the module and pass its parameters to it.

When an ad hoc request starts up, it instructs the Agent a Manager to fetch a bundle from the Control Repository. A bundle is a complex structure that contains modules, named parameter lists, and corequisite dependencies. For instance, a bundle for SNMP polling of hubs could be structured as follows:

```
bundle SNMP_hub_poller {
    module=SNMP_poller;           //name of Java module
    parms1=SNMP_hub_parms;        //variables to poll for
    parms2=davids_devices;        //list of devices to
                                  //poll
    parms3=normal_frequency;      //every 15 seconds
    needed_service=SNMP_polling;  //dynamic agent
                                  //manager must offer SNMP
                                  //polling service
}
```

This bundle encapsulates the following: the name of a Java module to run, three named sets of parameters, and a corequisite service the Agent Manager must offer. Bundling software needs to perform symbolic substitutions, and so requires a parameter list namespace.

An example of reuse will now be given. Suppose a bundle for polling bridging devices is set up as follows:

```
bundle SNMP_bridge_poller {
    module=SNMP_poller;            //name of Java module
    parms1=SNMP_bridge_parms;         //variables to poll
                                   //for
    parms2=franks_devices;         //list of devices to
                                   //poll
    parms3=high_frequency;         //every 5 seconds
    needed_service=SNMP_polling;      //dynamic agent
                                   //manager must offer SNMP
                                   //polling service
}
```

This bridge-polling bundle shares the Java module and corequisite service needs of the hub-polling bundle illustrated above. It achieves reuse by changing the incoming parameter lists designating the devices to poll, the variables polled for, and the frequency with which to poll them. In this instance, both bundles happen to be stored as such in the Control Repository. This is an implementation detail that reflects that the two kinds of polling are frequent occurrences for the system administrator, and therefore convenient to have persist. On-the-fly overrides can produce the same results, but demand that the administrator spend more effort at runtime.

More generally, the software must:

allow a request to override parameters by providing a list of values on the fly;

allow a request to override parameters by passing a different parameter list name than the default;

refer to a specific parameter list in a case where a module has several lists; and associate the parameter list override to a specific module in a bundle with multiple modules.

Thus, speaking more broadly, ad hoc requests are a mechanism for a user to manipulate the demand-data-flow behavior of the system. In some cases, this behavior is configured in a more-or-less predetermined way administrators set up beforehand (different bundles that have much overlap). In some cases, the behavior is fully ad hoc (the same bundle gets on-the-fly overrides). In broader terms, the system has the ability to add new behavior dynamically, in accordance with user needs. An existing, well-defined static structure provides the mechanism for adding the new behavior.

Potentially, many Agent Managers run in any particular copy of the system. An ad hoc request needs to find the right one to service its needs, and the Agent Manager needs to realize the demand for corequisite services. The preferred embodiment of the present invention deals with this issue through the concept of service. Broadly speaking, an object enlists the services of other objects when it passes the responsibility of returning some desired result set to those other objects. In the narrower context of bundles and Agent Managers, bundles need services from the execution context to run. Services are the codified sets of behavioral expectations within a configuration instance. That is, for the system to be able to handle SNMP device polling (for example), some component (or set of components) must have the responsibility of providing SNMP polling service. Each site may configure the services that are appropriate to its runtime environment and create configuration-time roles and services.

Any instance of the system of the invention must be able to provide a site-specific inventory of these services. Unless all services are available on all distributed Agent Managers, the system needs to maintain a catalog that tells it where it has distributed those services—which components it has charged with the responsibility of executing the proper tasks. A model such as CORBA Trading Services can meet this need.

Conversely, a Agent Manager charged with offering a given service needs to know how to offer it. Bundles play a role here, too. The Agent Manager requests a bundle from the Control Repository. The Repository maps the service structurally to a specific bundle (i.e., a module and its concomitant set of parameter lists). An operator can alter the implementation of the service at will, even dynamically. The Agent Manager in run time An Agent Manager with no control information starts up running only the configuration handler, the communications handler, the thread manager and the inter-thread queue routines. At this point, the Agent Manager has no information as to what its goal is, what dynamic agents to run, or how to pass its data to the next hop. An Agent Manager receives its higher level objectives through two data structures: the mission package and the bundle execution. The mission package can contain bundle executions, but its main purpose is to provide control information that allows the Agent Manager to situate itself in the mesh of the infrastructure (that is, what service it should advertise for the cascade, what service it should send to for the cascade).

Bundle executions are the instantiation of data structures that reside in the Control Repository called bundles. A bundle, as already described, ties together named parameter lists, named parameters, executable modules or scripts for building dynamic agents. Various portions of the bundle can be overridden to allow easy reuse. The actual content of a bundle that is passed to the Agent Manager, after any overrides have taken place, is the bundle execution.

Once a dynamic agent has started running within the context of the Agent Manager, it is independently addressable. That is, whatever component controls the dynamic agent—the end user in the case of an ad hoc request, the model in the case of a programmatic request—is able to address the dynamic agent independently of the Agent Manager. In other words, there is no need for the higher-order entity to understand the topology or constitution of the infrastructure in order to keep tabs on, or manipulate, the dynamic agent as it runs. Agent Managers are also independently addressable, since there are occasions—especially times of administrative interaction—where the Agent Manager, rather than some dynamic agent running under it, needs to receive control information.

All protocols and programming languages mentioned above herein are well known, and are incorporated herein by reference.

The foregoing description of the invention, and of the preferred embodiment thereof, is sufficient to enable one of ordinary skill to practice the invention without undue experimentation, and apprises one of ordinary skill of the best mode of doing so. Moreover, while the invention has been disclosed with reference to the preferred embodiment, many modifications and variations thereof will now be apparent to those of ordinary skill. Accordingly, the scope of the invention is not to be limited by the details of the preferred embodiment, but only by the appended claims.

What is claimed is:

1. A modeling system for modeling an external system that has plural components at least some of which are providing services to others of the components, the modeling system comprising a software model of the external system, and a server for the model;

the model comprising software objects instantiated based on respective portions of the system, wherein each software object includes first information defining any services that a corresponding component of the system is providing or receiving, and second information identifying the software object(s) corresponding to the component(s) of the system to/from which that component is providing/receiving the services, and wherein, responsive to occurrence of a predefined condition relating to either of a first and a second of the software objects one of which is providing at least one service to the other, the model server determines, based on the first and the second information, at least one path between the first and second objects along which that service can be provided.

2. A modeling system according to claim 1, wherein the model contains no information identifying such paths other than as a result of determination of such paths responsive to occurence(s) of such predefined condition.

3. A modeling system according to claim 1, wherein the predefined condition is occurrence of at least a degradation in performance of a component of the external system.

4. A modeling system according to claim 1, wherein at least one of the software objects is a group of others of the software objects.

5. A modeling system according to claim 4, wherein such group of software objects can be defined as a software object constituting part of the model, by a user of the modeling system.

6. A modeling system according to claim 5, further comprising displays of occurrences in the model are provided, and wherein the administrator can for each display, define a subset of such group of occurrences that are to be included in that display.

7. A modeling system according to claim 6, wherein at least some of the displays correspond to respective groups defined by the user.

8. A method of generating an interaction history of a portion of a system, by using a software model of the system that is a mathematical directed graph having nodes corresponding to respective components of the system and edges corresponding to services that are currently being provided by one component to another; said method comprising the steps of:

the model receiving information relating to an event occurring in a given component of the portion of the system and generating an indicator of degraded state in a software object corresponding to that component; and performing graph-traversal, said graph-traversal further comprising at least one of:

traversing the graph rootward, along at least one graph edge from that component in a first direction, from edge-head to edge-tail until edge of the graph is reached or until an object is reached for which a root-cause event has already been declared or until no further traversal in said first direction is possible, and traversing the graph leafward, along at least one graph edge in a second direction, from edge-tail to edge-head until no further traversal in said first direction is possible or until the traversal reaches a node already traversed, and said method being capable of both such rootward and such leafward traversal.

9. A method according to claim 8, wherein said receiving and generating step further comprises evaluating the received information and generating the indicator only responsive to a determination that the information meets a predetermined criterion.

10. A method according to claim 8, wherein the nodes of the graph are software objects.

11. A method according to claim 10, wherein the information received by the model is provided by execution of a program, and wherein the graph is one that has been generated by means of the program, and wherein the program performs the steps of:

identifying components of the system to be represented in the model and, for each component so identified, instantiating a respective software object that thus becomes a node of the graph;

once at least one software object representing one of the components has been instantiated, collecting information relating to the operation of such components as have thus far been identified and for which corresponding software objects have thus far been instantiated, and providing at least some of that information to the model; and the program repeating said identifying and instantiating step asynchronously as needed to continue constructing and updating the model, while the program continues performing said collecting step.

12. A method according to claim 9, wherein said leafward-traversing step is performed only after said rootward traversing step is performed and has reached an object for which a root-cause event has already been declared, and in which said leafward-traversing step is then performed commencing not at the given component but at the object for which the root-cause event has been declared.

13. A method according to claim 12, further comprising the step of displaying a representation of each object for which an indicator of degraded state has been declared.

14. A method according to claim 13, wherein the indicator of degraded state for any object with respect to which the model has received information indicating occurrence of a root-cause event in the component corresponding to that object, is displayed with a special indication that a root-cause event has occurred at the corresponding component.

15. A method according to claim 14, further comprising the step of maintaining records that include the occurrence of the degraded state and other degraded states (if any) encountered in the traversal of the graph in said performing step.

16. A method according to claim 13, wherein the nodes of the graph are software objects, and wherein the model also includes nodes that are software objects that comprise groups of other nodes, and wherein, if the given node in which the degraded state has occurred is such a group, the record relating to the occurrence a given degraded state includes only those other degraded states (if any) which have occurred in nodes which are immediate neighbors in the graph of the given node.

17. A method of predicting an impact of an event that has occurred in a system, by using a software model of the system that is a mathematical directed graph having nodes corresponding to respective components of the system and directed edges corresponding to services that are currently being provided by one component to another, each edge having an edge-tail at a node corresponding to a component providing the service to which the edge corresponds, and the edge having an edge-head at the node corresponding to the component receiving that service; said method comprising the steps of:

the model receiving information relating to an event occurring in a given component of the portion of the system and generating an indicator of degraded state in a software object corresponding to that component; and performing leafward graph-traversal to identify a portion of the system that is currently receiving services from the given component, said graph-traversal comprising traversing the graph leafward, along at least one graph edge in a direction from edge-tail to edge-head until no further traversal in said direction is possible or until the traversal reaches a node already traversed; and providing an indication of such portion of the system.

* * * * *